United States Patent
Villa

(10) Patent No.: US 12,540,457 B1
(45) Date of Patent: Feb. 3, 2026

(54) WATER AND HEAT HUB MICRO-SYSTEM AND METHOD

(71) Applicant: National Technology & Engineering Solutions of Sandia, LLC, Albuquerque, NM (US)

(72) Inventor: Daniel Villa, Alamo, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 309 days.

(21) Appl. No.: 17/958,848

(22) Filed: Oct. 3, 2022

(51) Int. Cl.
*E03B 7/07* (2006.01)
*E03B 1/04* (2006.01)
*E03B 7/04* (2006.01)

(52) U.S. Cl.
CPC .............. *E03B 7/075* (2013.01); *E03B 1/042* (2013.01); *E03B 7/04* (2013.01); *E03B 7/074* (2013.01)

(58) Field of Classification Search
CPC .......... E03B 7/075; E03B 1/048; E03B 7/045; E03B 7/078; F24D 17/0005; F24D 17/001; F24S 40/55
See application file for complete search history.

(56) References Cited

U.S. PATENT DOCUMENTS

| | | | | |
|---|---|---|---|---|
| 4,241,588 A | * | 12/1980 | Murphy | F24D 17/02 62/238.1 |
| 7,234,646 B2 | * | 6/2007 | Saitoh | F24D 17/02 62/238.1 |
| 2009/0026281 A1 | * | 1/2009 | McGreevy | F24D 17/0031 237/19 |
| 2010/0064710 A1 | * | 3/2010 | Slaughter | F24D 11/0214 62/238.7 |
| 2012/0061483 A1 | * | 3/2012 | Lee | F24H 15/219 237/63 |
| 2014/0069607 A1 | * | 3/2014 | Crook | F25B 29/003 165/63 |
| 2018/0180298 A1 | * | 6/2018 | Abbing | E03B 7/08 |
| 2019/0382988 A1 | * | 12/2019 | Cortez | F04F 10/00 |

* cited by examiner

*Primary Examiner* — Reinaldo Sanchez-Medina
(74) *Attorney, Agent, or Firm* — Daniel J. Jenkins

(57) ABSTRACT

A water and heat hub micro-system and method that provides heat exchange, water consumption, and micro-water-network capabilities, for example, to a single building system or a connected community system for heat and water management. The micro-system is capable of operating independently or may be aggregated with other water and heat hub micro-systems installed to a common network water interface and connected community system.

17 Claims, 11 Drawing Sheets

WATER AND HEAT HUB MICRO-SYSTEM AND METHOD

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to energy and resource conservation.

BACKGROUND

As energy costs continue to increase, the development of housing and business communities needs to include advanced energy and natural resource planning and development.

Energy management systems, as they currently exist, have been known to address issues like management of electricity or heat within a given system, such as a house. However, these known energy management solutions do not simultaneous address heat and water supply resilience. Likewise, these known systems fail to provide a structure to address larger systems, such as communities, towns or cities. Water supply resilience is a particularly important issue in areas susceptible to drought, such as in the southwestern United States. Scalable solutions that allow water and heat to be transacted in ways similar to electric microgrids can be an important part of achieving water resilience. Such systems have many analogs to electric grids but also have unique issues such as water quality for consumption. Water microgrids that manage water quality in individual buildings or groups of buildings are required technology if water resilience is to be achieved. Such systems need the capacity to transact water, assess its quality and accept or reject it as input to its own water microgrid.

What is needed are systems and/or methods that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE DISCLOSURE

The present disclosure is directed to a water and heat hub micro-system and method that provides heat exchange, water consumption, and micro-water-network capabilities, for example, to a single building system or a connected community system. The micro-system is capable of operating independently or may be aggregated with other water and heat hub micro-systems installed to a common network water interface and connected community system.

According to an embodiment of the present disclosure, a water and heat hub micro-system is provided for managing water and heat in water utilized by water appliances. The water and heat hub micro-system includes a thermal bridge having a controller controllably connected to at least one mixing valve, at least one isolation valve and a pump. The thermal bridge is arranged and disposed to selectively combine water from a fresh water source (e.g., utility water), a network water interface and a local water source to output product water to one or more water appliances. The water appliances and the thermal bridge being in fluid communication by component supply lines. The controller operates the at least one mixing valve, the at least one isolation valve and the pump in response to signals corresponding to one or more of temperature, pressure and water quality measurements.

According to another embodiment of the present disclosure, a method is provided for transferring heat and water utilized by water appliances. The method includes providing water to water appliances through a thermal bridge. The thermal bridge includes a controller controllably connected to at least one mixing valve, at least one isolation valve and a pump. The thermal bridge is arranged and disposed to selectively combine water from a fresh water source, a network water interface and a local water source to output product water to one or more water appliances. The water appliances and the thermal bridge are in fluid communication by component supply lines. Operating the at least one mixing valve, the at least one isolation valve and the pump with the controller in response to signals corresponding to one or more of temperature, pressure and water quality measurements.

According to another embodiment of the present disclosure, a connected community system is provided for managing water and heat in water utilized by water appliances. The water and heat system includes a plurality of water and heat hub micro-systems. Each water and heat micro-system includes a thermal bridge. The thermal bridge includes a controller controllably connected to at least one mixing valve, at least one isolation valve and a pump. The thermal bridge is arranged and disposed to selectively combine water from a fresh water source, a network water interface and a local water source to output product water to one or more water appliances. The water appliances and the thermal bridge are in fluid communication by component supply lines. The controller operates the at least one mixing valve, the at least one isolation valve and the pump in response to signals corresponding to one or more of temperature, pressure and water quality measurements.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE DISCLOSURE

Disclosed herein is a new and useful systems and methods that enable heat exchange, water consumption, and micro-water-network capabilities to a single building or community system. The systems and methods can operate independently or aggregate with other water and heat hub micro-systems installed to a common potable water thermal bridge loop and community micro-water network. The water and heat hub micro-system according to the present disclosure allows the operation of any set of appliances that consume, store and/or exchange heat with water and enables efficient consumption and exchange of heat for water systems. Systems according to the present disclosure reduce the energy burdens through the reduction or elimination of simultaneous heating and cooling by major water interacting appliances, while also providing the ability to provide continued water service, such as may be required in emergency situations.

Figure 1:
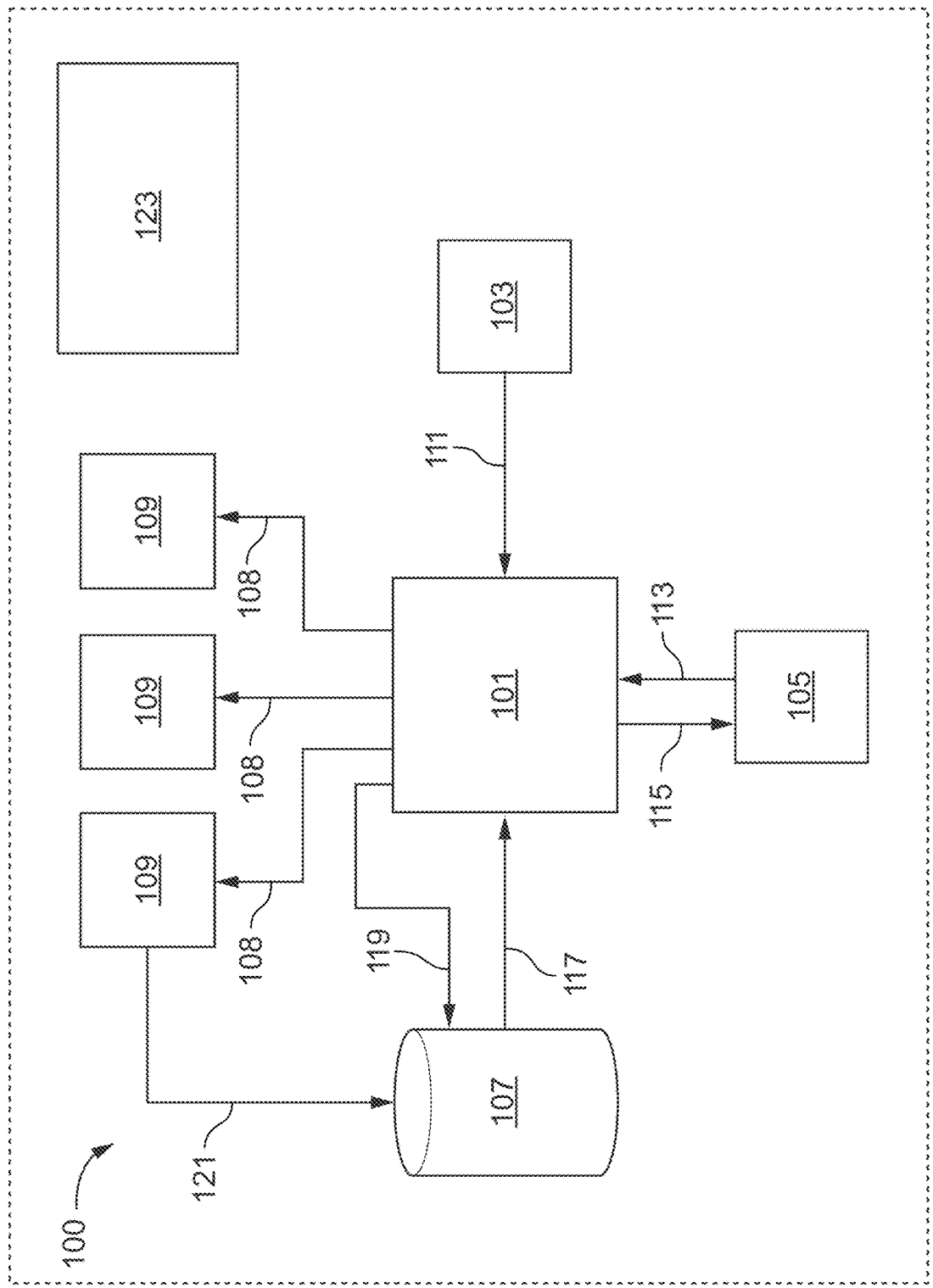
FIG. 1 schematically illustrates a heat and water hub micro-system according to an embodiment of the present disclosure.

FIG. 1 illustrates a water and heat hub micro-system 100 according to an embodiment of the present disclosure. As can be seen in FIG. 1, the water and heat hub micro-system 100 includes a thermal bridge 101, which selectively receives and combines water from a fresh water source 103, a network water interface 105 and a local water source 107. The thermal bridge 101 receives the water from each of the fresh water source 103, the network water interface 105 and the local water source 107 and outputs product water 108 to water appliances 109. Water appliances 109, as utilized herein, are appliances or other similar devices that interact with water, such as by consuming water, exchanging heat with water or otherwise contacting water. In one embodiment, two different types of appliances are envisioned: 1) dead-end appliances that utilize all the water they receive and no return line is needed and 2) return appliances that utilize some or none of the water receive but rather exchange heat and then return remaining water back to the thermal bridge loop. Examples of water appliances 109 could include, but are not limited to, water source heat pumps for air-conditioning, heat pump water heaters (or other types of water heaters receiving pre-conditioned water), local water storage tanks, reverse osmosis systems, direct lines to end uses, water source heat pump refrigerators and freezers, a line with return to a ground heat exchanger or other appliance capable of interacting with water through either heat exchange or water consumption.

The thermal bridge 101 combines water from the fresh water source 103, the network water interface 105 and the local water source 107 to output product water 108 to one or more water appliances 109. The water that is distributed from thermal bridge 101 is mixed from the various water sources, as needed, to provide an amount of heat and water needed by water appliances 109. The fresh water source 103 provides fresh water supply 111, which may be provided from a water utility, a well, desalination technology, water harvesting device from air, or other water source capable of providing potable water. The temperature at which the fresh water supply 111 typically is at or near the ground temperature (i.e., 60-75° F.). The network water interface 105 provides a network supply 113, which may be water from a local water microgrid which is used as a larger scale thermal bridge, which allows mixing of water from elsewhere in a community or area, such as from elsewhere in a connected community system 300 (see for example FIG. 3). In addition, the network discharge 115 is water that is discharged from the thermal bridge 101 to provide water, for example, to the connected community system 300, other water community utilization, or another water and heat hub micro-system 100 for use in water appliances 109. The thermal bridge 101 may also receive water from the local water source 107 via local supply 117. The local supply 117 is water stored by the local water source 107. The local water source 107 may be any vessel or tank capable of storing water. The local water source 107 may receive water from the thermal bridge 101 via the local water storage stream 119 or the appliance water discharge 121 from a water appliance 109. In other embodiment, the local water source 107 may be supplied directly from the fresh water source 103.

Also shown in FIG. 1 is control system 123, which provides overall control to the water and heat hub micro-system 100. Control system 123 is any suitable control system arrangement known for providing analysis and control of equipment present in the water and heat hub micro-system 100. For example, control system 123 may include any number of processors, multi-processor cores, or other types of processor, depending on the particular implementation. In addition, control system 123 may include memory storage devices. A storage device is any piece of hardware that is capable of storing information, such as, for example, without limitation, data, program code in functional form, and/or other suitable information either on a temporary basis and/or a permanent basis. The storage devices may also be referred to as computer readable storage devices in these examples. Memory, in these examples, may be, for example, a random access memory or any other suitable volatile or non-volatile storage device. Other storage devices may include a hard drive, a flash memory, a rewritable optical disk, a rewritable magnetic tape, or some combination of the above. Control system 123 may include components that provide for communications with other data processing systems or devices. For example, the components for communication may include a network interface card, which may provide communications through the use of either or both physical and wireless communications links. Further the control system 123 may include input/output devices for input and output of data with other devices that may be connected to control system 123. For example, the components may provide a connection for user input through a keyboard, a mouse, and/or some other suitable input device and may provide a mechanism to display information to a user. Control system 123 is arranged and configured to provide communication of data and/or control to devices within the water and heat hub micro-system 100, to other heat hub micro-systems 100 or to systems fluidly connected to the network water interface 105. The control system 123 also provides analysis of the data received and both provides control to the water and heat hub micro-system 100 and is able to communicate to components and systems outside the water and heat hub micro-system 100 to provide information and analysis about the water and heat hub micro-system 100 that is useful for the control of components and systems outside the water and heat hub micro-system 100.

Figure 2:
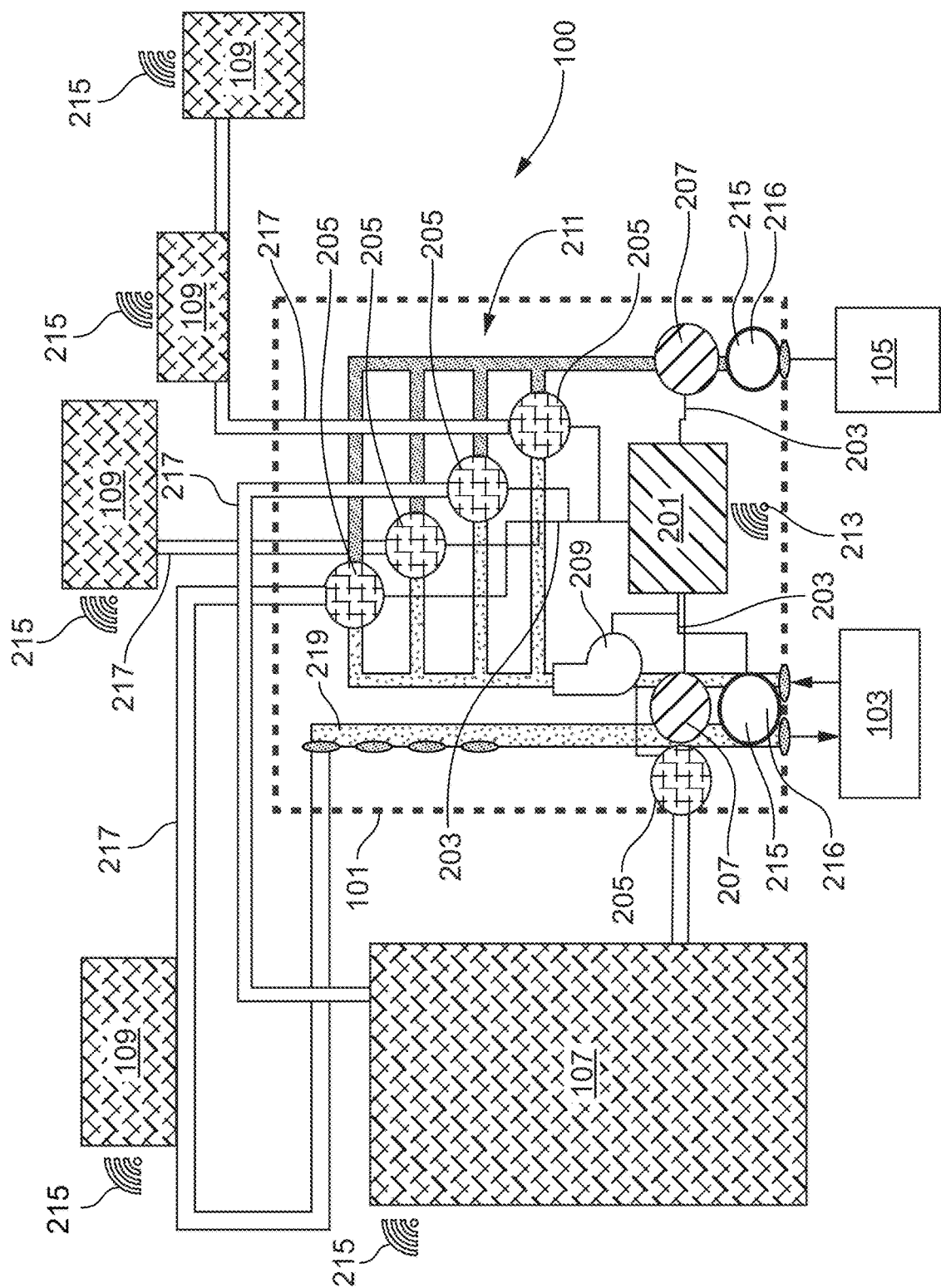
FIG. 2 schematically illustrates an exemplary arrangement of a heat and water hub micro-system according to an embodiment of the present disclosure.

FIG. 2 shows a water and heat hub micro-system 100 having an exemplary arrangement according to an embodiment of the disclosure. As can be seen in FIG. 2, the water and heat hub micro-system 100 enables efficient or optimal heat exchange, water consumption, and micro-water-network capabilities, for example, to a single building system. The water and heat hub micro-system 100 is arranged to either operate independently or to aggregate with other water and heat hub micro-systems 100 installed to a common potable water thermal bridge loop and community micro-water network. The water and heat hub micro-system 100 includes a thermal bridge 101 having a controller 201. Controller 201 is a component of the control system 123, as shown and described in FIG. 1. Controller 201 is controllably connected via control lines 203 to mixing valves 205, isolation valves 207 and a pump 209. The mixing valves 205 and isolation valves 207 are arranged in a manifold 211 that permits controlled mixing of water from the various water sources, including the fresh water source 105, the network water interface 103 and the local water source 107. Controller 201 operates the mixing valves 205, the isolation valves 207 and the pump 209. The controller 201 receives signals from sensors in response to signals corresponding to one or more of temperature, pressure and water quality measurements. The controller 201 may be any suitable controller, including, for example, a transactive central controller that mediates competing priorities for water and heat at each appliance and with other water and heat hub micro-system controllers that are connected via the network water interface 105. The controller 201 regulates the mixing valves 205 in communication with each water appliance 109 to provide the thermal needs of the corresponding water appliance 109. The needs of the corresponding water appliances are determined by the measurements by the various sensors 215. For example, water heaters will need the hottest water available between the thermal bridge 101 and the fresh water source 103. Therefore, controller 201 will operate the isolation valves 207 and mixing valves 205 to mix the highest temperature water for delivery to the water appliance 109. In another example, if the water appliance 109 is a heat pump utilized for cooling applications, such as in the summer, heat may be provided to the thermal bridge 101 or local water source 107 via operation of the isolation valves 207 and mixing valves 205 by controller 201 for use in other water appliances 109 or to provide to the network water interface 105. However, in winter, the water appliance 109 may revert to the fresh water source 103 whose ground temperature may be at a higher temperature. In these examples, the controller 201 may utilize the components of the thermal bridge 101 to direct water at a higher temperature to other water appliances 109 where heat may be extracted for heating needs, such as heating of the building. In one embodiment, the water appliance 109 may include a local reverse osmosis system that may be efficiently or optimally controlled based on pressure and temperature fluctuations of water that could increase filter life of the reverse osmosis system. In addition, the local water source 107 may be filled or drained according to desired water demand and pump performance issues.

The water and heat hub micro-system 100 may provide local water resilience by operation of isolation valves 207. Controller 201 receives pressure, temperature and water quality measurements at a receiver 213 from a number of sensors 215 and utilizes these measurements to determine the operation of the mixing valves 205, the isolation valves 207 and pump 209. Sensors 215 may include temperature sensors, such as thermometers, thermocouples, thermistors or other temperature measuring devices. Likewise, sensors 215 may include water quality sensors 216, such as oxygen sensors, chlorine sensors, salinity sensors, pH sensors, turbidity sensors, conductivity sensors, chemical oxygen demand sensor, dissolved oxygen sensor, redox potential sensor or any other water quality sensor known in the art. In the embodiment shown in FIG. 2, the water quality sensors 216 are positioned upstream of the isolation valves 207 in order to permit detection of unacceptable water quality and isolation of the unacceptable water from the water and heat hub micro-system 100. For example, if the controller 201 receives a signal from a sensor 215 indicating that the water is not safe or is not at service conditions, the controller 201 operates an isolation valve 207 to shut off the flow of water from the source of water that was determined not to be safe or otherwise being at below a service condition. A similar control is provided for the thermal bridge 101 that reverts the thermal bridge 101 to operation that is isolated from the network water interface 105 and/or the fresh water source 103 providing, for example, building-level islanding capability. Under these conditions, pump 209 is activated to work harder to provide pressure for delivery of water to the water appliances 109 and the water service may continue until local water source 107 is depleted.

In another embodiment, controller 201 of the thermal bridge 101 monitors pressure via sensors 215 to ensure sufficient pressure is provided to the system to continue operation. If the controller 201 senses a low pressure, for example at the fresh water supply 111, the controller 201 operates the isolation valve 207 to isolate the water and heat hub micro-system 100 from the fresh water source 103 and, optionally, from the network water interface 105. In addition, controller 201 operates pump 209 to maintain pressure in the water and heat hub micro-system 100.

In order to provide efficient operation, the controller 201 obtains one or more of one or more of the temperature, pressure and water quality measurements resulting from a first operation, for example, operation of the mixing valves 205, the isolation valves 207 and pump 209. The operating by the controller 201 operates at least one mixing valve, at least one isolation valve and the pump according to a second operation that is in response to the temperature, pressure and/or water quality measurements resulting from a first operation. The controller 201 may further iteratively obtain temperature, pressure and/or water quality measurements and provide operation by the controller 201 in response to the iterative measurements of the temperature, pressure and/or water quality measurements. In addition, controller 201 may provide data and/or analysis to other components within the control system 123 to provide control to the water and hub micro-system 100 and/or to provide information to components or systems outside the water and hub micro-system 100.

Thermal regulation must be present such that heat rejection capabilities can balance any heat load mismatches present on a water and heat hub micro-system 100 setup. The water and heat hub micro-system 100 heat rejection may also be supplied by optimally releasing heat content back to sewage or gray water systems for areas where water usage is not a concern. Alternatively design of heat rejection external to the water and heat hub micro-system 100 may provide efficient or optimal operation possible on the building-level or community level water system. Heat rejection is envisioned through ground heat exchangers but might also include cooling towers (loss of water and heat by evaporation), water-air heat exchangers, and water-water heat exchangers. Regardless of the form of heat exchange is employed, the system must be maintained as potable water. In other embodiments, if heat cannot be controlled, based on the heat loads and/or the conditions, the controller 201 will indicate an alarm or indicator showing that the heat is not able to be controlled.

While not so limited, in an embodiment, the water and heat hub micro-system 100 shown in FIG. 2 is a single hub having a manifold 211 with four component supply lines 217 and component return lines 219. Each of the component supply lines 217 and the component return lines 219 include insulation to avoid undesirable heat transfer. The water appliances 109 are arranged into a desirable configuration including, for example, external heat/water use appliances, heat exchangers, or water purification systems. Controller 201 balances the heat loads and learns how to respond to new loads should the water and heat hub micro-system 100 be reconfigured. In one embodiment, controller 201 is configured to interface with smart appliances that receive energy and water efficiency feedback for artificial intelligence (AI) learning algorithms. In certain embodiments, controller 201, through receiver 213, receives online streams of data concerning external ambient conditions, historic demand data, and forecasts of ambient conditions and demands that are utilized in configuring the operation of the various valves and pumps. The setup envisions transactive control where devices interfacing with the controller 201 are able to make requests for water and heat. Each device 209 votes for specific outcomes for control variables in their own interest and then the controller makes optimal or near optimal decisions based on the broader perspective of the system's state, the votes of the devices it is providing service to, and objectives such as water availability, quality, and energy efficiency. Innate to this model are machine learning algorithms which perform unsupervised learning on patterns of heat and water consumption by individual devices. The pattens are then subsumed into the machine learning algorithm such that the aforementioned forecasts enable the controller algorithm to think ahead by performing functions such as preheating or precooling local water storage to meet anticipated future demand more efficiently. The energy efficiency of the entire system and water availability during outages are variables that unsupervised learning can use to evaluate the effectiveness of control decisions. In addition, controller 201 may provide and/or receive data from other components within the control system 123 or from components or systems outside the water and hub micro-system 100 to provide feedback for artificial intelligence (AI) learning algorithms.

Figure 3:
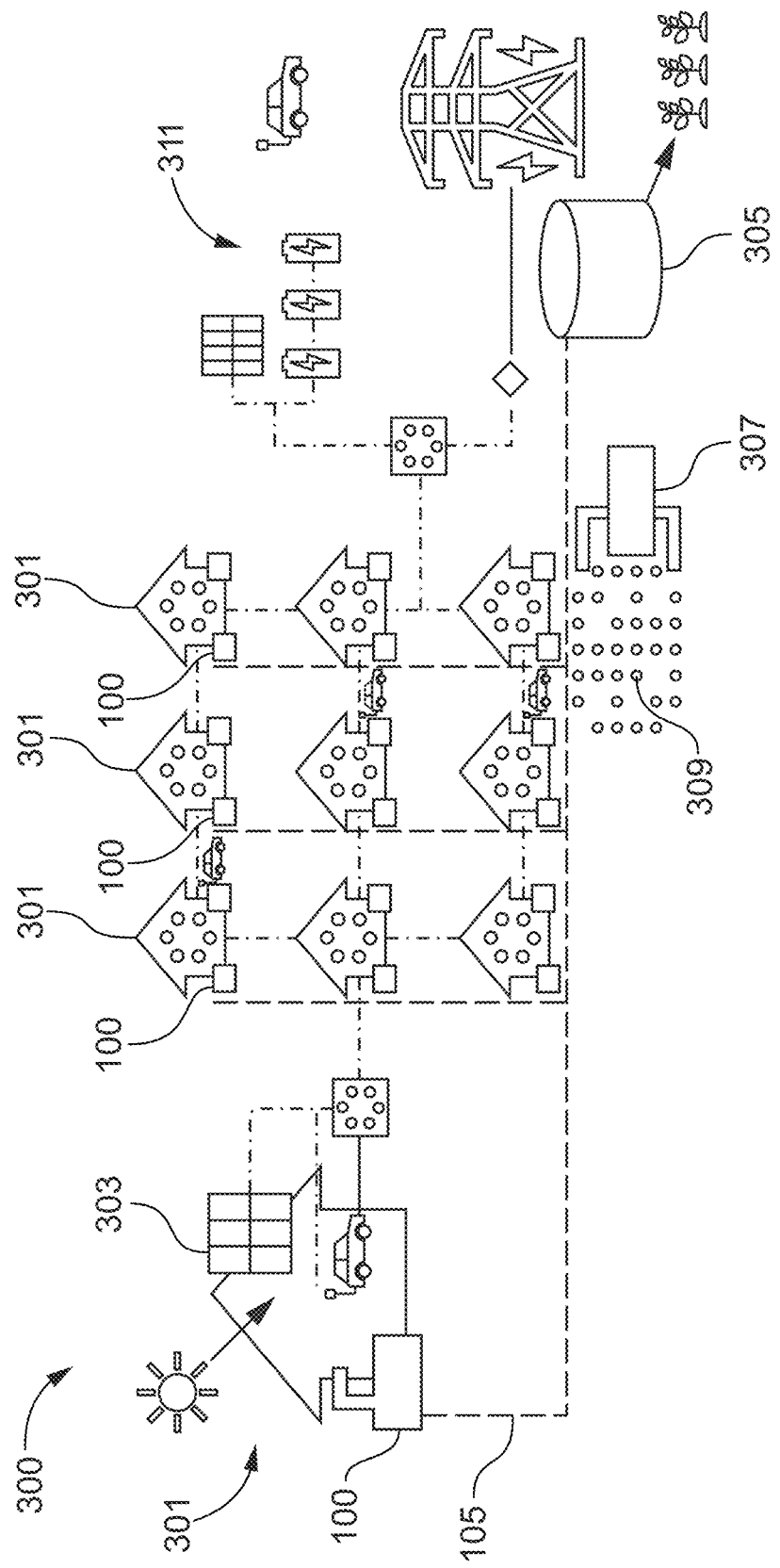
FIG. 3 illustrates an exemplary connected community system according to an embodiment of the present disclosure.

FIG. 3 shows an example showing how a connected community system 300 including grid-interactive efficient buildings 301 might employ the water and heat hub micro-system 100. The connected community system 300 includes a range of energy efficiency and distributed energy resource features. As can be seen in the exemplary embodiment shown in FIG. 3, the connected community system 300 includes photovoltaic panels 303 installed, for example, on the roof-top, micro-grid controllers and battery storage platform, and a water and heat hub micro-system 100 that exchanges heat between the units of the connected community system 300 via network water interface 105. The connected community system 300 connects water and heat hub micro-system 100 that, for example, may, through use of the water and heat hub micro-system 100 and water exchange with the network water interface 105, supply both hot water and air-conditioning to the grid-interactive efficient buildings 301. This thermal connectivity can save significant amounts of energy because waste heat can be relocated to a location where it would otherwise require electric or fossil fuel consumption to produce it. The water and heat hub micro-system 100 may become a scalable part of such connected communities where it interacts with electric microgrid transactive systems such that competing needs for electricity, water, and heat are all negotiated by centralized system controllers for the community resources such as water thermal storage, community PV and batteries, and grid price signals. The system priorities become complex due to the presence of both an electric microgrid and a water microgrid. The system will have different control strategies for: 1) water service and electric service operational, 2) water service operational but electric service down, 3) water service down but electric service operational, and both water and electric service operational.

Figure 4:
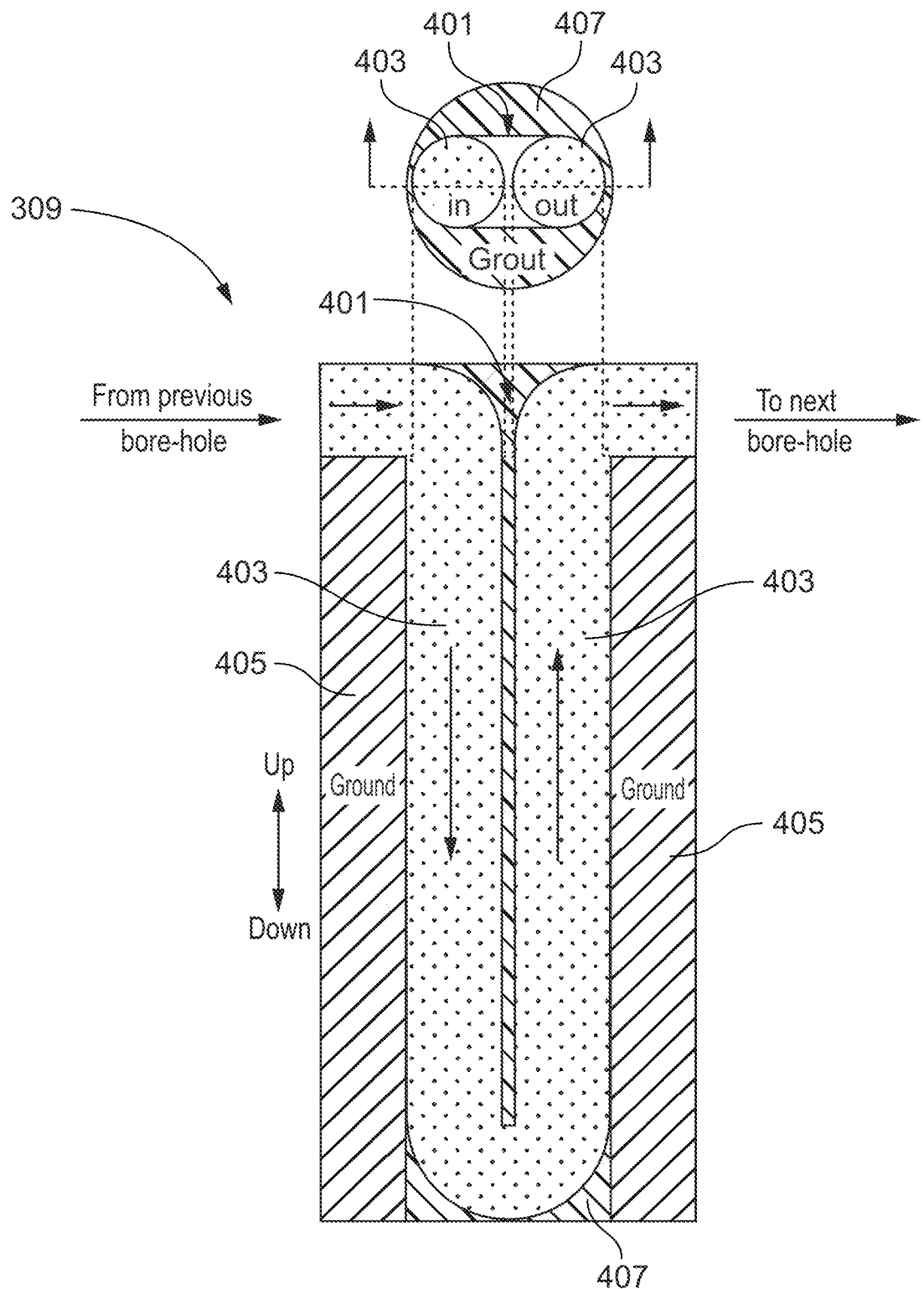
FIG. 4 shows a schematic diagram of a ground source heat exchanger with a single bore-hole according to an embodiment of the present disclosure.

For example, a water and heat hub micro-system 100 of running a grid-interactive efficient buildings 301 may include air conditioning that provides heat from its condenser into the water and heat hub micro-system 100 or the network water interface 105. This heat may find a constructive use for the hot water heater of another connected grid-interactive efficient building 301 by providing water in the loop that is warmer and therefore requires less work by the water and heat hub micro-system 100 hot water heat pumps of the first grid-interactive efficient buildings 301. These effects can especially become pronounced when different users request simultaneous heating and cooling in different units during shoulder seasons in areas such as the United States' southwest (for example March-May and September-November). In one embodiment, the efficient energy use of the connected community system 300 will be further facilitated by the network water interface 105 that is connected to a community thermal storage tank 305 which is in turn connected to a ground source heat pump 307 that is capable of pre-heat and pre-cool operations on the community thermal storage tank 305. The ground source heat pump 307 may be connected to the network water interface 105 so that economization of ground heat can be accomplished when it is more efficient than active heating and cooling by the ground source heat pump 307. In addition to the ground source heat pump 307, the connected community system 300 includes a ground source heat exchanger 309 (see also, FIG. 4). While not so limited, FIG. 4 shows a ground source heat exchanger 309 having a bore-hole 401 having two pipes 403 that are connected by a 180 degree fitting at the bottom of the borehole 401. The orientation of the pipes 403 and the bore-hole 401 are not particularly limited and may include other configurations and orientations. The pipes 403 are thermally connected to the ground 405 and each other through a grout 407 that fills in empty space in the bore-hole 401. Assuring the bore-hole 401 is fully filled is important to assuring that the high thermal conductivity grout material thermally couples to the ground 405. Other geometries including four pipes 403 or greater designs may be used. In one embodiment, both loops and the economizing piping must be suitable for meeting water quality standards. For example, in one embodiment, no antifreeze is utilized because the ground source heat exchanger 309 provides sufficient ground heat in the winter to keep any of the water from approaching freezing temperatures. Both the ground source heat pump 307 and the ground source heat exchanger 309 are connected to the network water interface 105 that permits the transfer of heat to or from the water of the network water interface 105 to meet the desired temperatures of the water. Control of the ground source heat pump 307 and the ground source heat exchanger 309 may come from a local controller or a network controller that controls the overall system.

The community thermal storage tank 305 as shown in FIG. 3 is connected to network water interface 105, which allows transfer of water to and from the community storage tank 305 to the water and heat hub micro-systems 100 of the grid-interactive efficient buildings 301. In one embodiment, the community thermal storage tank 305 is connected with a water-to-water heat exchanger (not shown) that has a pump (not shown) to circulate water to exchange heat with the ground source heat pump 307 which provides active capacity to extract heat from the community storage tank 305. The fresh water source 103, for example from a utility or well, is distributed to each grid-interactive efficient building 301. This added water, which may be a ground temperature may be used advantageously for applications needing different thermal conditioning of the various waterstreams for distribution to the water and heat hub micro-systems 100. In each of the grid interactive efficient buildings 301 and in the corresponding water and heat hub micro-system 100, the fresh water source 103 may be shut off with a isolation valve (see for example, FIG. 2) that isolates the system if pressure from the fresh water source 103 is lost. If isolated, the pump 209 and local water source 107 (e.g., tank elevation head) provides pressurization of the water and heat hub micro-system 100. In this embodiment, the connected community system 300 may include a pressure reducing valve at the inlet to the community thermal storage tank 305 to allow the circulation pump (not shown) to provide additional pressurization, while utilizing less kinetic energy.

In this exemplary embodiment, the connected community system 300 will not only have series of water and heat hub micro-systems 100 for use with grid-interactive efficient buildings 301, but will also have an electricity micro-grid 311 for efficiently distributing electricity to homes and vehicles.

Each grid-interactive efficient building 301 utilize specific plumbing configured to enable the water and heat hub micro-system 100. Each grid-interactive efficient building 301 will have access for consumption of both utility delivered water (i.e., the fresh water source 103) or local tanks (i.e., the local water source 107), as shown in FIGS. 1 and 2. Various heat loads from household water appliances 109 including a water source heat pumps and heat pump water heater will interact with the water and heat hub micro-system 100. Other water appliances 109, such as refrigerators and heat pump clothes dryers may also be able to interact with the water and heat hub micro-system 100. The interconnectivity of various heat loads will enable coordination of smart devices to keep the overall water and heat hub micro-system 100 heat load for the grid-interactive efficient buildings 301 to be advantageous to the overall efficiency and heat and water management. The controller 201 operates the components of the thermal bridge 101, including the mixing valves 205 and isolation valves 207 of manifold 211. Manifold 211 provides the following functions. First, manifold 211, via control from controller 201, is capable of switching water sources (e.g., cold and hot water sources) between the fresh water supply 111 and the network water interface 105. This switching capability provides significant energy savings. For example, in summer, the network water interface 105 is likely the source of the hot water and will already be preconditioned warm water due to large amounts of heat being rejected by water appliances 109 elsewhere in the system. Use of this water will reduce the energy expended to produce the heat load needed for hot water at the water appliances 109 and will also reduce the heat rejection load required for the water and heat hub micro-system at the community thermal storage tank 305. During winter, this situation could reverse itself where the utility water is warmer than the thermal bridge 101 because of excessive heat being extracted from the thermal bridge 101. Second, manifold 211, via controller 201, is operated to provide occupant comfort, for example in a household, with respect to hot and cold water streams (e.g., from the fresh water source 103, network water interface 105 and the local water source 107). The fresh water source 103 is important for hot summer periods where the network water interface 105 water will reach luke-warm temperatures that are unappealing for occupants desiring a cold water source. Third, during outages or emergencies, such as water utility outages, manifold 211, via controller 201, is capable of shutting off the fresh water source 103 where water from the network water interface 105 and/or the local water source 107 supply the entire house-hold supply for the water and heat hub micro-system 100. Under these conditions, occupant comfort with the supply water temperature may be ignored.

EXAMPLES

Connected Community System Model

Figure 5:
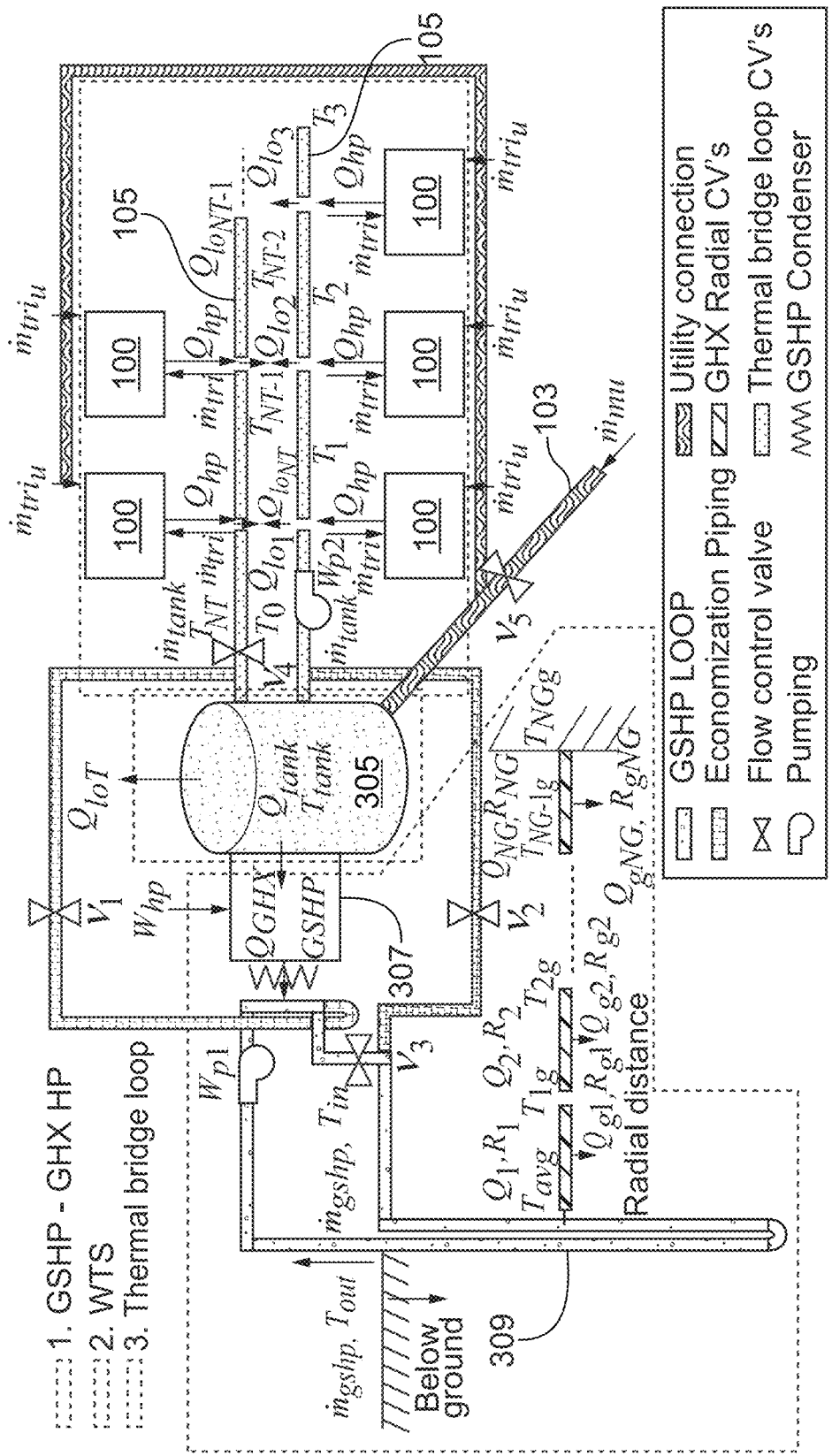
FIG. 5 shows a model diagram of a community thermal storage tank, ground source heat pump, water and heat hub micro-system according to an embodiment of the present disclosure.

A model is presented here that illustrates the connected community example and demonstrates that the said system provides increased water resilience and energy savings simultaneously. The connected community system model includes control columes (CV) that are assumed to be well-mixed as seen in FIG. 5. A community thermal storage tank 305 and a ground source heat pump 307 serve as a bridge between a discretized 1-D ground source heat exchanger 309 model and a discretized 1-D water and heat hub micro-system model including pipe segments that each connect to a network of water and heat hub micro systems 100. Both the community thermal storage tank 305 and the ground source heat pump 307 are modeled by time transient Ordinary Differential Equations (ODE) whereas a steady state assumption is made for the community network water interface 105 and water and heat bug micro-system 100 heat loads.

Nomenclature:

| Variable | Description | Value | Unit | Note |
|---|---|---|---|---|
| $C_1, C_2, \ldots C_{NG}$ | Heat capacitance of radial sections of ground for dynamic GHX model | Variables | J/K | Derived from $T_{1g}, T_{2g}, \ldots, T_{NGg}$ |

-continued

| Variable | Description | Value | Unit | Note |
|---|---|---|---|---|
| $C_{bore}$ | Sum of GHX bore-hole heat capacitance for water, grout, piping, and fittings | Variable | J/K | |
| $c_{gr}$ | Ground specific heat | 810 | J/(kg · K) | Based off sand/gravel/clay/silt mixtures characteristic of Albuquerque |
| $c_p$ | Specific heat of water | 4.17e+03 | J/(kg · K) | |
| $C_{tank}$ | WTS tank heat capacitance of water storage | Variable | J/K | |
| cool | Boolean indicating whether GSHP may cool (True) or heat (False) the WTS tank | Variable | | True if $T_{tank} \geq T_{tank_{targ}}$ |
| COP | Coefficient of performance for the GSHP | Variable | | Determined by bounded fraction of Carnot efficiency $\eta_c$ |
| $COP_{ashp}$ | Rated COP for ASHP for equivalent unconnected triplex calculation | 3 | | |
| $COP_{ASHP}$ | Overall coefficient of performance for an unconnected ASHP set of triplexes | Variable | | |
| $COP_{ASHP_y}$ | Yearly overall coefficient of performance for an unconnected ASHP set of triplexes | Variable | | |
| $COP_{carnot}$ | Carnot efficiency | Variable | | |
| COPcc | Overall coefficient of performance for the WTS-GSHP-TBL system | Variable | | |
| $COP_{CC_y}$ | Yearly overall coefficient of performance for the WTS-GSHP-TBL system | Variable | | |
| $COP_h$ | COP for heating | 5 | | If Heating Carnot efficiency > 5, COP = 5.0 |
| $COP_{h_{max}}$ | Specified maximum heating COP for the GSHP | Variable | | Bounds COP to lower values than the Carnot efficiency $\eta_c$ |
| $COP_{wshp}$ | Rated COP for WSHP in triplex units | 4.2 | | |
| D | Half spacing between the axes of two pipes in a single bore-hole | Variable | m | For this analysis = $\frac{1}{3}(d_b + d_0)$ |
| $D_b$ | Distance between bore-holes | 5.3 | m | center to center |
| $d_b$ | GHX bore-hole diameter | 0.152 | m | 6 in |
| $d_i$ | Inner diameter of bore-hole pipe | 0.022 | m | 0.866 in |
| $d_o$ | Outer diameter of bore-hole pipe | 0.026 | m | 1 in |
| $d_{pi_{tri}}$ | Thermal bridge pipe inner diameter | 0.305 | m | 12 inch pipe inner diameter |
| $d_{po_{tri}}$ | Thermal bridge pipe outer diameter | 0.318 | m | 12.5 inch pipe |

-continued

| Variable | Description | Value | Unit | Note |
|---|---|---|---|---|
| $d_{tank}$ | WTS tank diameter | 3 | m | |
| $D_{trench}$ | Thermal bridge pipe trenching depth | 1 | m | |
| $D_{tri}$ | Distance between triplex unit water source heat pumps | 10 | m | This is pipe length which may be much greater than the linear length |
| $f_{bl}$ | Fraction of Bore-hole length below bore depth to ground temperature | 4.19e−09 | | Model calibrating factor equal to the fraction of bore-hole length to ground temperature heat reservoir that is never affected by the GHX |
| $f_{i\dot{m}_{tri}}$ | Daily hot water use fraction for each hour of day | [0.0062, 0.0029, 0.00085903, 0.00082057, 0.0031, 0.0219, 0.075, 0.0794, 0.0765, 0.0669, 0.0611, 0.0488, 0.0423, 0.0376, 0.0328, 0.0376, 0.0437, 0.0578, 0.0686, 0.0654, 0.0593, 0.0486, 0.0423, 0.0235] | | Typical hot water use fractions per (Wilson et. al., 2014 https://www.osti.gov/biblio/971094 |
| $h_{e_{gshp}}$ | Elevation change along in-out of GSHP GHX loop | 0 | m | |
| $h_{tank}$ | Water thermal storage (WTS) tank height | 2-6 | m | Parameter study variable determines tank volume and water resilience |
| $k_g$ | Ground thermal conductivity | 0.4 | W/(m · K) | Based off sand/gravel/clay/silt mixtures characteristic of Albuquerque |
| $k_{gr}$ | Bore-hole grout thermal conductivity | 1.3 | W/(m · K) | Silcone/sand mixture |
| $k_p$ | Pipe material thermal conductivity | 0.39 | W/(m · K) | High density polyurethane |
| $k_{tank}$ | WTS tank insulation thermal conductivity | 0.001 | W/(m · K) | |
| $L_b$ | Bore-hole length | 90 | m | |
| $l_{k_{tank}}$ | WTS tank insulation thickness | 0.1 | m | |
| $\dot{m}_{gshp}$ | GSHP loop mass flow | Control | kg/s | Used to regulate $\Delta T_{gshp}$ |
| $\dot{m}_{gshp_{max}}$ | GSHP loop Mass flow capacity | 10 | kg/s | |
| $\dot{m}_{mu}$ | Total mass flow from utility input line to neighborhood | Control | kg/s | Is assumed to be equally balanced with $NT\dot{m}_{tri}$ |
| $\dot{m}_{tank}$ | Mass flow out of the WTS tank that is diminished by $\dot{m}_{tri}$ at each triplex | Control | kg/s | Determines $W_{p2}$ |
| $\dot{m}_{tank_0}$ | Control initial value for $\dot{m}_{tank}$ | Control | kg/s | |
| $\dot{m}_{tank_{max}}$ | Maximum bound for mass flow out of the WTS tank $\dot{m}_{tank}$ | Control | kg/s | |

-continued

| Variable | Description | Value | Unit | Note |
|---|---|---|---|---|
| $\dot{m}_{tbl_{max}}$ | Mass flow capacity for the thermal bridge loop | 10 | kg/s | |
| $\dot{m}_{tank_{min}}$ | Minimum bound for mass flow out of the WTS tank $\dot{m}_{tank}$ | Control | kg/s | |
| $\dot{m}_{tbl_{min}}$ | Minimum flow allowed by controller for thermal bridge loop | 1 | kg/s | |
| $\dot{m}_{tank_{targ}}$ | Target value for \dotm_gshp before several logical considerations | Control | kg/s | |
| $\dot{m}_{tri}$ | Triplex hot water consumption from TBL side | Variable | m³/s | |
| $\dot{m}_{tri_{daily}}$ | Triplex hot water daily total consumption from TBL side | 66.7 | gal/day | $\dot{m}_{tri} + \dot{m}_{tri_u} = 66.7$ |
| $\dot{m}_{tri_u}$ | Triplex hot water consumption from utility side | Variable | m³/s | Controls will optimize where to use water from |
| $N_b$ | Total number boreholes | 45-125 | | Varied in the parameter study |
| NG | Number of radial CV's to model GHX | 21 | | |
| NT | Number of triplex units serviced by thermal bridge | 30 | | |
| $Q_1, \ldots, Q_{NG}$ | Radial Heat transfer rates between ground CVs for dynamic GHX model | Variables | W | Derived from $T_{1g}, T_{2g}, \ldots, T_{NGg}$ |
| $Q_{AC}$ | Heat flow from WSHP to TBL via WSHP refrigerant to water condenser | Variables | W | |
| $Q_D$ | Heat flow from TBL to heat pump dryer in triplex | Variables | W | Unlikely to implement because of lack of commercial models |
| $Q_{econo}$ | Heat flow from GHX to WTS via economization mass flow | Variables | W | |
| $Q_F$ | Heat flow from Refrigerator to TBL via refrigerant to water condenser | Variables | W | Unlikely to implement because of lack of commercial models |
| $Q_{g1}, \ldots, Q_{gNG}$ | Heat transfer rates to $T_g$ for dynamic GHX model | Variables | W | Calibrating factors derived from $f_{bl}$, $T_g$, and $\{T_{1g}, T_{2g}, \ldots, T_{NGg}\}$ |
| $Q_{GHX}$ | Net heat flow from GHX to WTS | Variables | W | Combination of $W_{hp}$, COP, and $Q_{econo}$ |
| $Q_{hp}$ | Triplex heat pump condenser heat taken from or added to thermal bridge | Variable | W | |
| $Q_{hpe}$ | Triplex heat pump evaporator-side heat taken triplex thermal zone | Variable | W | |
| $Q_{lo_1}, \ldots, Q_{lo_{NT}}$ | Heat losses/gains to ambient BC for each thermal bridge loop CV | Variables | W | Derived from $T_1, \ldots, T_{NT}$ and $T_a$ |
| $Q_{loT}$ | Heat losses/gains to ambient BC from the WTS | Variables | W | |
| $Q_{rc_{wshp}}$ | Rated cooling capacity of triplex unit WSHP | 3.52e+03 | W | 1-ton unit |

-continued

| Variable | Description | Value | Unit | Note |
|---|---|---|---|---|
| $Q_{rh_{wshp}}$ | Rated heating capacity of triplex unit WSHP | 3.52e+03 | W | 1-ton unit |
| $Q_{tank}$ | Heat drawn from/to WTS by GSHP | Control | W | Determined by $W_{hp}$ |
| $Q_{tank_{targ}}$ | Target value for Qtank before several logical considerations | Control | W | |
| $Q_U$ | Heat flow from TBL to triplex via hot water mass flow | Variables | W | |
| $Q_{WH}$ | Heat flow from TBL to triplex via hot water heat exchange | Variables | W | |
| $R_1, R_2, \ldots, R_{NG}$ | Radial Heat transfer thermal resistance between CVs for dynamic GHX model | Variables | K/W | |
| $R_{11}$ | GSHP thermal resistance for upward and downward flow to bore-hole the ground | Variable | K/W | |
| $R_{12}$ | GSHP thermal resistance between upward and downward flows | Variable | K/W | |
| $r_b$ | Radius of bore-holes | 0.0762 | m | 0.90 in |
| $R_b$ | Total thermal resistance of GHX bore-hole | Variable | K/W | |
| $R_{g1}, R_{g2}, \ldots, R_g$ | Heat transfer thermal resistance to ground for dynamic GHX model | Variables | K/W | |
| $r_{g1}, r_{g2}, \ldots, r_{gNG}$ | radii of ground cylindrical sections for dynamic GHX model | Variables | J/K | Follow a logarithmic scale |
| $r_i$ | Inner radius of bore-hole pipe | 0.011 | m | 0.90 in |
| $R_{lo}$ | TBL pipe thermal resistance per CV | Variable | K/W | |
| $r_o$ | Outer radius of bore-hole pipe | 0.013 | m | 1.00 in |
| $R_{sides}$ | WTS tank thermal resistance for the tank sides | Variable | K/W | |
| $R_{tank}$ | WTS tank total thermal resistance | Variable | K/W | |
| $R_{top}$ | WTS tank thermal resistance for the tank top | Variable | K/W | |
| $SHR_{tri}$ | Rated sensible heat ratio for triplex unit WSHP | 0.75 | | |
| $t$ | time | Variable | s | |
| $T_0, T_1, \ldots, T_{NT}$ | Thermal bridge loop CV in and out temperatures between triplex units | Variables | K | |
| $T_{1g}, T_{2g}, \ldots, T_{NG}$ | GHX radial temperatures spaced on a log scale | Variables | K | |
| $T_a$ | Ambient atmospheric drybulb temperature | Variable | K | Comes from historical weather files |
| $T_{avg}$ | Average temperature of water in GHX | Variable | K | $T_{avg} = \dfrac{T_{in} + T_{out}}{2}$ |
| $T_{c_{tri}}$ | Triplex cooling thermostat setpoint | 298 | K | 76° F. |

-continued

| Variable | Description | Value | Unit | Note |
|---|---|---|---|---|
| $T_g$ | Ground temperature | 293 | K | Based on Reiter, 2006 https://doi.org/10.2113/gseegeosci.12.4.353 |
| $T_{h_{tri}}$ | Triplex heating thermostat setpoint | 295 | K | |
| $T_{hw}$ | Triplex hot water heater setpoint | 333 | K | Typical value for hot water heaters |
| $T_{in}$ | Temperature of water going into the GHX | Variable | K | |
| $T_{out}$ | Temperature of water exiting the GHX | Variable | K | |
| $T_{tank}$ | WTS tank temperature (output to thermal bridge loop) | Variable | K | |
| $T_{tank_{targ}}$ | Target for WTS tank temperature | [290.35, 298.55, 302.55, 290.35] | K | Values for 1/4 year (winter, spring, summer, fall). Future analyses need need to optimize these values |
| $t_{targ}$ | target time which the thermal WTS thermal controller seeks to reach $T_{tank_{targ}}$ in. | Variable | s | |
| $v_1, v_2, \ldots, v_5$ | Valve control variables that enable economization and conversion to micro-net | Control | | These are not included in the current model but are implied by the logic |
| $\dot{V}_{a_{tri}}$ | Rated air flow for ASHP and WSHP | 0.153 | m³/s | 325 CFM per Comfort Air Model HB-009 |
| $V_{tank}$ | WTS tank volume | Variable | m³ | |
| $W_{ashp}$ | Work put into air-side heat pumps for air-source scenario | Control | W | |
| $W_c$ | GSHP Compressor capacity | 10000 | W | |
| $W_{hp}$ | Compressor power delivered to GSHP | Control | W | $W_{hp} > 0$ |
| $W_{hp_{max}}$ | Compressor power maximum capacity for GSHP | Control | W | |
| $W_{p1}, W_{p2}$ | Power input to pumping for thermal bridge loop and GSHP | Control | W | These are calculated from $\dot{m}_{tank}$ and $\dot{m}_{gshp}$ |
| $W_{wshp}$ | Work put into water-side heat pumps in Triplexes | Control | W | |
| wait | Boolean indicating whether GSHP is to wait for GSHP operation regardless of cool | Variable | | Function of deadband $\Delta T_{tank_{targ}}$, $T_{tank_{targ}}$, and $T_{tank}$ |
| $wait_0$ | Previous time step's value of wait | Variable | | |
| β | Dimensionless ratio of bore-hole length to heat capacity rate and thermal resistance | Variable | | Diao et. al. 2004. https://doi.org/10.1080/10789669.2004.10391114 |
| $\Delta T_{dead}$ | WTS tank thermostat deadband | 5 | K | |
| $\Delta T_{gshp}$ | Target GSHP temperature delta between input and output | 2 | K | Temperature delta target for GHX - control adjusts flow to meet this |
| $\Delta T_{loop}$ | Temperature gain/loss at in/out of thermal bridge loop | 2 | K | Mass flow is used to keep this constant |

-continued

| Variable | Description | Value | Unit | Note |
|---|---|---|---|---|
| $\Delta T_{tank_{targ}}$ | Temperature deadband about $T_{tank_{targ}}$ for GSHP | 2 | K | Mass flow is used to keep this constant |
| $\varepsilon$ | Heat exchanger efficiency for boreholes | Variable | | Diao et. al. 2004. https://doi.org/10.1080/10789669.2004.10391114 |
| $\eta_c$ | Fraction of Carnot efficiency of GSHP | 0.8 | | COP = $\eta_c COP_{carnot}$ |
| $\rho$ | Density of water | 998 | kg/m³ | |
| $\rho_g$ | Ground Density | 1.9e+03 | kg/m³ | Based off sand/gravel/clay/silt mixtures characteristic of Albuquerque |

Governing Equations

The governing equations are balanced with the number of variables. The model variables are all temperatures:

1. Ground source heat pump 307 input and output temperatures from the bore-hole field, $T_{in}$ and $T_{out}$.
2. The community thermal storage tank 305 temperature, $T_{tank}$.
3. The vector of ground temperatures for the ground source heat exchanger 1-D radial model, $T_g = \{T_{1g}; T_{2g}; \ldots, T_{NGg}\}$. This model's spatial resolution can be increased by increasing the number of ground temperature elements, NG.
4. Vector of triplex unit water temperatures for the 1-D water and heat hub micro-system model, $T = \{T_1, T_2, \ldots; T_{NT}\}$. Unlike the GHX model, the number of triplexes NT should not be increased for refining the model because it is tied to the total heat load exerted on the thermal bridge.

The number of variables and equations in the system is therefore equal to NG+NT+3. These variable's values are constrained by Boundary Conditions (BC) derived from the ground temperature $T_g$ ambient air temperature $T_a$, and several control variables elaborated herein.

$$C_{tank}\frac{dT_{tank}}{dt} = \quad (2.1)$$
$$c_p((\dot{m}_{tank} - NT\dot{m}_{tri})T_{NT} - \dot{m}_{tank}T_{tank} + (\dot{m}_{mu} - NT\dot{m}_{tri_u})T_a) - Q_{tank} - Q_{IoT}$$

$$c_p((\dot{m}_{tank} - (i-1)\dot{m}_{tri})T_{t-i} - (\dot{m}_{tank} - i\dot{m}_{tri})T_i) + Q_{lo_i} + Q_{hp} = 0 \quad (2.2)$$

$$C_{bore}\frac{dT_{avg}}{dt} = Q_{GHX} - Q_1 \quad (2.3)$$

$$Q_{GHX} - \dot{m}_{gshp}c_p(T_{in} - T_{out}) = 0 \quad (2.4)$$

$$C_j\frac{dT_{jg}}{dt} = Q_j - Q_{j+1} - Q_{gj} \quad (2.5)$$

Equation 2.1 is the governing ODE for the community thermal storage tank 305. Equation 2.2 is the set of equations governing the water and heat hub micro-system 100 where there is a CV between each triplex unit on the thermal bridge 101 i={1, 2, . . . , NT}. Equation 2.3 is the thermal mass ODE for the ground heat exchanger where $T_{avg} = (T_{in} + T_{out})/2$ and Equation 2.4 equilibrates the heat moved by the ground source heat pump equal to that moved by the GHX. Finally, Equation 2.5 consists of NG CV with thermal mass ODE constraints, j={1, 2, . . . , NG}, and $Q_{NG+1}=0$. Section 2.3 discusses the calculation of non-control BC driven heat flux terms in the governing equations which are functions of the temperature variables as well.

Heat Flow Terms

Fourier's law of thermal conduction is used to characterize the heat flow terms in the governing equations. Temperature is assumed to vary linearly across each CV. Formulas are referenced below for calculating the various heat flow terms contained in the governing equations for the tank, thermal bridge loop, triplex energy plus modeling, triplex heat pumps, and the ground source heat pump model.

Tank

The community thermal storage tank 305 is assumed to have steady heat flow to/from it at the same rate as heat flows from the ground source heat exchanger 309. The ground source heat pump loop mass flow, economization, and work put into the heat pump compressor are controlled to quantify $Q_{GHX}$ and $Q_{tank}$ as derived herein. In addition, the community thermal storage tank 305 exchanges heat from ambient conditions at a rate of $Q_{IoT}$. This heat flow is dependent on the parallel resistance between the top and sides of the tank. Losses to the ground are neglected in the model.

$$Q_{IoT} = \frac{T_{tank} - T_a}{R_{tank}} \quad (2.6)$$

$$R_{tank} = \frac{1}{\frac{1}{R_{top}} + \frac{1}{R_{sides}}} \quad (2.7)$$

$$R_{top} + \frac{4l_{tank}}{k_{tank}\pi d_{tank}^2} \quad (2.8)$$

$$R_{sides} = \frac{1}{2\pi k_{tank} h_{tank}} \log\left(\frac{\frac{d_{tank}}{2} + l_{tank}}{\frac{d_{tank}}{2}}\right) \quad (2.9)$$

The thermal mass of the community thermal storage tank 305 is assumed to be well approximated by the thermal mass of the water contained in it.

$$V_{tank} = \pi \frac{d_{tank}^2}{4} h_{tank} \quad (2.10)$$

$$C_{tank} = c_p \rho V_{tank} \quad (2.11)$$

Water and Heat Hub Micro-System

Figure 6:
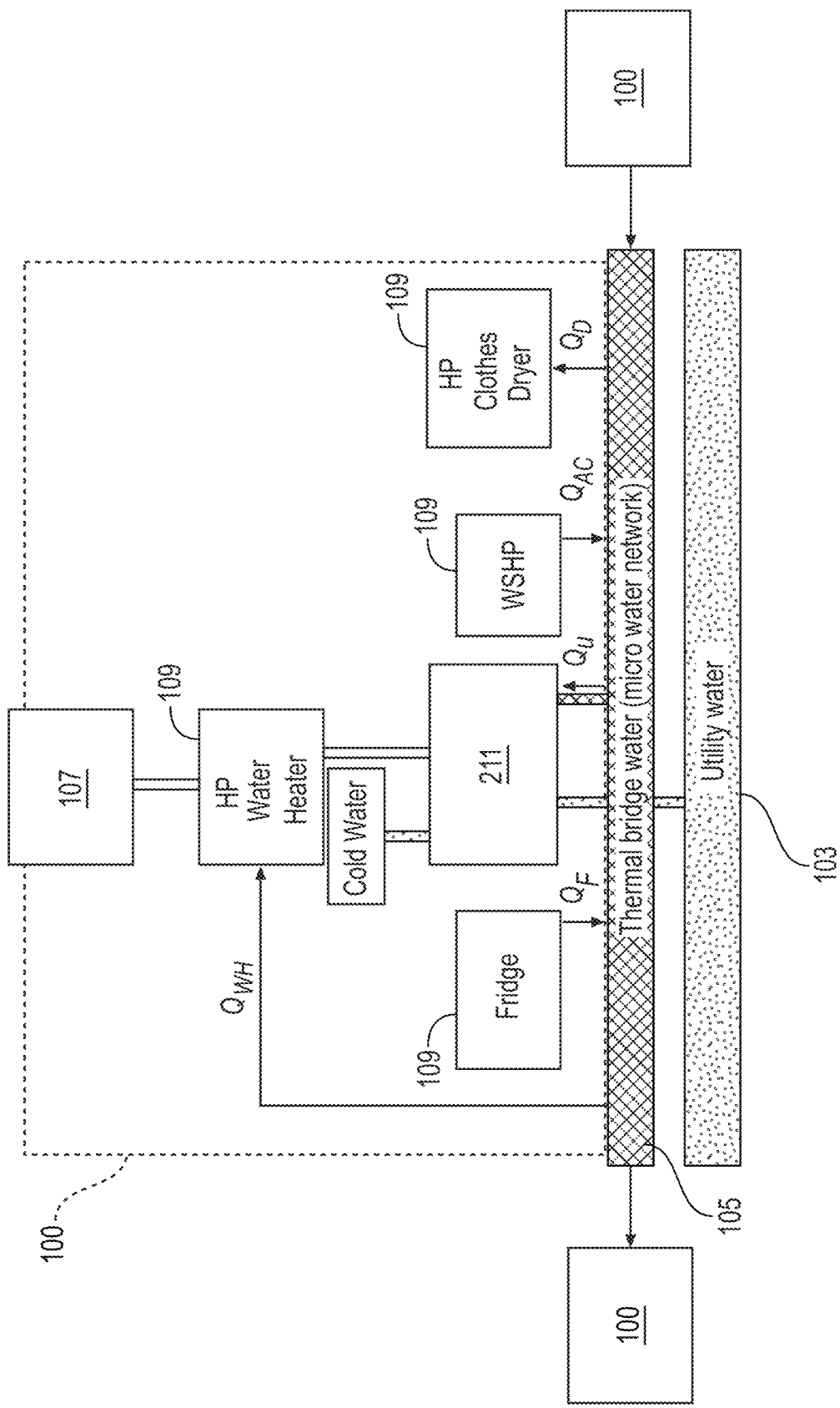
FIG. 6 shows a schematic diagram of an exemplary arrangement of components of the model diagram of FIG. 5.

The water and heat hub micro-system mass flow rate is used to keep the temperature change at input and output equal to a constant value. This mass flow rate dimishes as water is consumed at a rate of $\dot{m}_{tri}$ at each triplex. The rate of consumption is assumed to be the same for every day of the year and is based on the 2014 Building America House Simulation Protocols (Wilson, E. C. Engebrecht Metzger, S. Horowitz, and R. Hendron. "2014 Building America Housing Simulation Protocols." *National Renewable Energy Laboratory Technical Report* NREL/TP-5500-60988. https://doi.org/10.2172/1126820) total water consumption fractions by hour of the day, $f_{im\ tri}$, as seen in FIGS. 5 and 6. The hot water use per day, $\dot{m}_{tri}$, for each triplex unit, was given a value of 66.7 gal/day.

$$\dot{m}_{tri} = f_{im_{tri}} \dot{m}_{tri_{daily}} \quad (2.12)$$

Though the design specifies for switching between cold and hot water consumption between the water and heat hub micro-system and utility, the model currently assumes that cold water consumption, $\dot{m}_{triu}$, is always from the utility and has no effect on the thermal performance of the system. Also, effects of other household appliances besides hot water and each water and heat hub micro-system's ground source heat pump 307 are neglected in this analysis even though other effects are illustrated in FIGS. 5 and 6.

Losses from the water and heat hub micro-system 100, $Q_{loi}$, occur at each water and heat hub micro-system 100. The pipe thermal resistance, average temperature of fluid along the pipe, properties of the ground, and ambient temperature are used to estimate these losses. The loss model is approximated as steady state heat flows from each CV. The pipe 403 is assumed to be surrounded by a cylinder of ground whose radius is the trench depth, $D_{trench}$, for the pipes. This cylinder is assumed to be surrounded by ambient conditions neglecting the film between the ground and ambient air.

$$Q_{lo_i} = \frac{T_A - \frac{T_i + T_{i-1}}{2}}{R_{lo}} \quad (2.13)$$

$$R_{lo} = \frac{1}{2\pi k_p D_{tri}} \ln\left(\frac{d_{po_{tri}}}{d_{pi_{tri}}}\right) + \frac{1}{2\pi k_g D_{tri}} \ln\left(\frac{D_{trench}}{d_{po_{tri}}}\right) \quad (2.14)$$

Here, $k_p$ is the pipe thermal conductivity, $D_{tri}$ is the distance between triplexes, $d_{po_{tri}}$ is the pipe outer diameter, $d_{pi_{tri}}$ is the pipe inner diameter, and kg is the thermal conductivity of the ground.

Water and Heat Hub Micro-System Energy Plus Modeling

The heat added by the ground source heat pump 307 of each water and heat hub micro-system 100 is approximated by heat loads from the DOE proto-type multi-family housing model and normalized to the square footage of the triplex units. Typical Meteorological Weather 3 data was used to run Energy Plus to quantify the heat load taken from each triplex thermal zone $Q_{hp_e}$. These calculations are derived from the same analyses as for the baseline Energy Plus model results from above. The DOE proto-type multi-family dwelling with Air-Source Heat Pump (ASHP), cement slab, climate zone 4B, and configured to International Energy Conservation Code (IECC) version 2018 was used.

Figure 7:
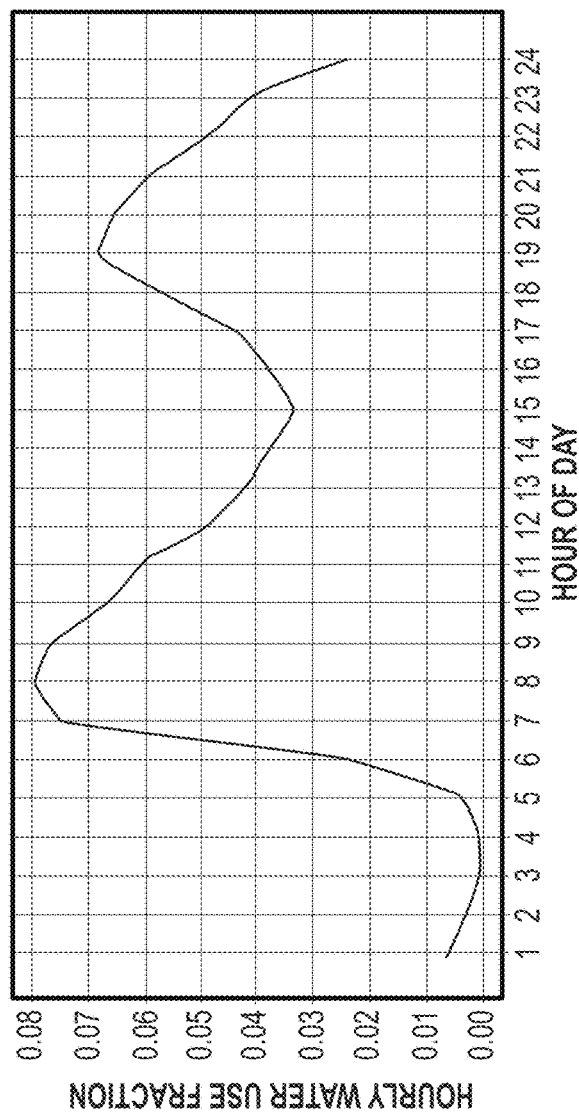
FIG. 7 shows a graph displaying hourly water use fractions for use in the model of FIG. 5.
Figure 8:
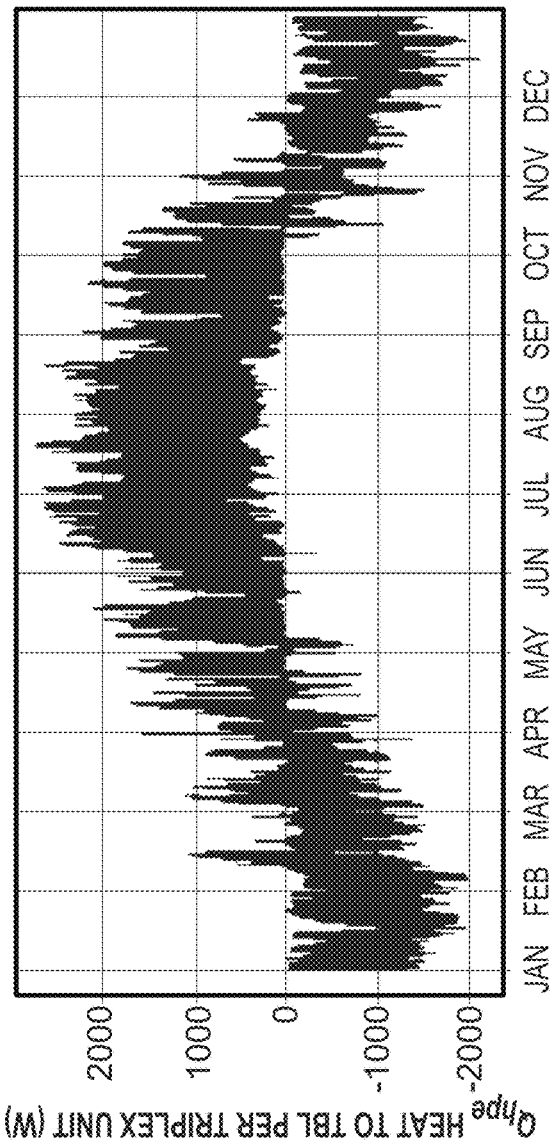
FIG. 8 shows a graph displaying hourly average heat taken from each water and heat hub micro-system for use in the model of FIG. 5.

FIG. 7 shows the hourly water use fractions utilized in the model. FIG. 8 shows the resulting hourly heat load rejected to (+) or taken from (−) the thermal loop. The calculations assume each water and heat hub micro-system 100 is 1451 ft². The heat load on the condenser of the ground source heat pump 307 was calculated through: 1) Calculating the compressor work to be equal to the electricity input for all Heating Ventilation and Air Conditioning (HVAC) minus total electricity used for HVAC fans; 2) Summing all heat flow in the 20 zones for the multi-family unit DOE prototype; and 3) Assuming no other losses were significant and normalizing by the conditioned square footage of the multi-family unit (21,610 ft²).

Water and Heat Hub Micro-System Heat Pumps

This study compares two different energy use cases. The first assumes that there is no community thermal storage tank 305, ground source heat pump 307, water and heat hub micro-system 100 and that each water and heat hub micro-system 100, each corresponding to a triplex unit, houses an air source heat exchanger that has no thermal interaction with other water and heat hub microsystems 100. The compressor and fan power needed to shed the heat loads taken from each triplex unit (FIG. 8) are calculated per Cutler et. al. (D. Cutler, J. Winkler, N. Kruis, C. Christensen, and M. Brandemuehl. Improved modeling of residential air conditioners and heat pumps for energy calculations. Technical report, National Renewable Energy Laboratory and University of Colorado, Boulder, CO, January 2013. Technical Report NREL/TP-581-43156). The calculations include inefficiencies due to starting and stopping of the equipment over the time step (run time fraction regression of efficiency) and ambient to internal conditions efficiencies losses in comparison to the rated performance.

For the second case, the system includes a community thermal storage tank 305, ground source heat pump 307, and water and heat hub micro-systems 100. The ground source heat pump performance was also approximated with a higher rated Coefficient of Performance (COP) and air-source temperature equal to the water and heat hub micro-system 100 instead of ambient conditions. This provides a reasonable approximation. In addition to calculating the required power input, the condenser side heat load ($Q_{hp}$ in FIG. 5) was calculated using the actual system COP calculated via performance curves and the heat load being taken away from the triplex, $O_{hpe}$ (FIG. 8). The effects of ambient conditions and how humid and hot conditions degrade A/C performance were therefore captured between the air-source heat pump and water source heat pump options.

Ground Source Heat Pump

The ground source heat pump model is a gray-box model that uses physics based parameters and a calibrating factor fbl to synchronize its performance to more accurate thermal models that include 3-D geometry effects. The factor fbl represents the fraction of bore-hole length, $L_b$, below the bore-hole at which ground temperature is always sustained. This sink provides permanent heat flow away from the ground source heat exchanger 309 whereas a set of NG CV's is used to capture transient spreading of heat within the radial distance between bore-holes. It is assumed that each bore-hole is perfectly insulated at the equidistant diameter to other bore-holes.

The ground source heat pump model uses the work of Diao et. al. (N. R. Diao, H. Y.

Zeng, and Z. H. Fang. Improvement in modeling of heat transfer in vertical ground heat exchangers. HVAC&R Research, 10(4): 459-470, 2004) which uses a solution of a finite line source to derive a heat exchanger bore-hole efficiency to calculate the bulk behavior of a bore-hole input fluid temperature, output fluid temperature and boundary temperature between the ground and the bore-hole boundary. For a 2-pipe U-tube configuration, the resistance is calculated between the circulating downward flowing fluid (coming in) and the bore-hole wall Ru as seen in Equation 2.15. This expression is derived with the 2-D asymmetry of the 2-Pipe configuration being considered.

$$R_{11} = \frac{1}{2\pi k_{gr}}\left[\ln\left(\frac{r_b}{r_o}\right) + \frac{k_{gr}-k_g}{k_{gr}+k_g}\ln\left(\frac{r_b^2}{r_b^2-D^2}\right)\right] + R_p \quad (2.15)$$

Here, kgr is the grout thermal conductivity, kg is the ground thermal conductivity, $r_b$ is the bore-hole radius, $r_o$ is the bore-hole pipe outer radius, D is the half distance between bore-holes, and $R_p$ is the pipe thermal resistance that is calculated as the familiar thermal resistance of a cylindrical section. The convective resistance from fluid flow is neglected in this analysis. Also, the thermal resistance for upward (outward) flowing fluid is assumed to be the same as for inward ($R_{11}=R_{22}$).

$$R_p = \frac{1}{2\pi k_p}\ln\left(\frac{r_o}{r_i}\right) \quad (2.16)$$

The remaining resistance is for heat transfer between the input and output fluids.

$$R_{12} = \frac{1}{2\pi k_{gr}}\left[\ln\left(\frac{r_b}{2D}\right) + \frac{k_{gr}-k_g}{k_{gr}+k_g}\left(\frac{r_b^2}{r_b^2+D^2}\right)\right] \quad (2.17)$$

The bore-hole efficiency heat exchanger model is repeated here from Diao et. al.

$$\varepsilon = \frac{T_{in}-T_{out}}{T_{in}-T_{avg}} = \frac{2\tanh(\beta)}{\sqrt{\frac{R_{11}+R_{12}}{R_{11}-R_{12}}} + \tanh(\beta)} \quad (2.18)$$

$$\beta = \frac{L_b}{\dot{m}_{gshp}c_p\sqrt{(R_{11}+R_{12})(R_{11}-R_{12})}} \quad (2.19)$$

The total thermal resistance of a bore-hole is completed by implementing the 2-D formulation for total thermal resistance during zero mass flow in the bore-hole field and implementing the pseudo 3-D formulation for periods with mass flow. This avoids division by zero when no mass flow is present.

$$R_b = \begin{cases} \frac{R_{11}+R_{12}}{2} & \dot{m}_{gshp}=0 \\ \frac{L_b}{\dot{m}_{gshp}c_p}\left(\frac{1}{\varepsilon}-\frac{1}{2}\right) & \dot{m}_{gshp}>0 \end{cases} \quad (2.20)$$

The heat transfer from the bore hole field to the ground, $Q_1$ is therefore proportional to the resistance of the bore-hole field and the first CV for the ground shown in Equation 2.21

$$Q_1 = \frac{T_{avg}-T_{1g}}{R_b+R_1} \quad (2.21)$$

$$R_1 = \frac{1}{2\pi k_g}\ln\left(\frac{r_{g1}}{r_b}\right) \quad (2.22)$$

All remaining heat transfer rates in the ground source heat exchanger CV's along the radial direction are then calculated according to:

$$Q_1 = \frac{T_{jg}-T_{(j-1)g}}{R_j} \quad (2.23)$$

$$R_1 = \frac{1}{2\pi k_g}\ln\left(\frac{r_{gj}}{r_{g(j-1)}}\right) \quad (2.24)$$

In these equations j={2, 3, ..., NG}. Each ground source heat exchanger CV also includes a resistance to ground temperature. These terms serve to calibrate the model behavior to results from a higher resolution ground source heat exchanger model.

$$Q_{jg} = \frac{T_{jg}-T_g}{R_{gj}} \quad (2.25)$$

$$R_{gj} = \frac{f_{bl}L_b}{\frac{\pi}{4}(r_{gj}^2-r_{g(j-1)}^2)k_g} \quad (2.26)$$

The radii, $r_{gi}$, are generated by forming a set of NG+2 radii with log 10-scale spacing between $r_b$ and D. This log scale spacing provides higher resolution at the bore-hole to ground interface where the most important transient heat dynamics occur. As the radius from the bore-hole axis increases, the transient dynamics become much more slow because of the larger amounts of thermal mass involved in comparison to smaller radii.

Controls

For each time step, the associated control variables of the connected community system 300 are determined after the variables of the governing equations have been solved. These boundary condition values to the equation set are regulated by simple controls in the current model that do not include the dynamics of the pumps, heat pumps, and valves involved. Each control value has saturation limits based on the capacities of the associated equipment. Refer to FIG. 5 for a view of where the control variables affect the overall system. The following are control variables that are determined as boundary conditions (BC) for each time step.

1. The mass flow rate out of the tank m tank is used to control the temperature rise or drop along the thermal loop.

2. The heat flow between the community thermal storage tank 305 and the ground source heat exchanger 309 is used to shed excess heat or add heat enabling load shifting capacity to the water and heat hub micro-systems 100. This heat load is controlled by a combination of active use of the ground source heat pump 307 via work input to its compressor, $W_{hp}$, and economization, $Q_{econo}$, accomplished by opening valves $v_1$ and $v_2$ while closing $v_3$. A Coefficient of Performance (COP) model is used to estimate the efficiency of use of the ground source heat pump 307. The valves are not explicitly modeled in the current model but the mass exchange via economization is regulated to be optimal for cases where economization can save energy.

3. The mass flow rate for the ground source heat pump loop, $\dot{m}_{gshp}$ is used to regulate the temperature drop or rise through the ground source heat exchanger 309.

The control BCs require a number of constant inputs to the model.

1. Tank target temperature $Tt_anktarg$ is changed seasonally by manual input. In the future, this should be part of a control algorithm that finds the optimum value for energy efficiency, load shift capacity, and resilience depending on the current system priorities.

2. The temperature drops across the water and heat hub microsystems 100, $\Delta T_{loop}$, and ground source heat pumps 307, $\Delta T_{gshp}$, are given target constant values.
3. The length of time, tt$_a$rg which the thermal control seeks to reach $T_{tanktarg}$ in.

Mass Flow from Community Thermal Storage Tank

The mass flow out of the tank is independent from cooling/heating status and is controlled to ensure that the temperature drop across the loop is close to $\Delta T_{loop}$. This is accomplished by taking the current heat balance (neglecting hot water consumption) and dividing by the constant value $\Delta T_{loop}$. The resulting proposed mass flow, $\dot{m}_{tank_0}$, must be greater than a minimum flow, $\dot{m}_{tankmin}$ and lesser than the maximum flow capacity $\dot{m}_{tankma}$.

$$\dot{m}_{tank_0} = \frac{\left|\sum_{i=1}^{NT} Q_{lo_i} + NT Q_{hp}\right|}{c_p \Delta T_{loop}} \quad (2.27)$$

$$\dot{m}_{tank} = \begin{cases} \dot{m}_{tank_0} & \dot{m}_{tank_{max}} > \dot{m}_{tank_0} > \dot{m}_{tank_{min}} \\ \dot{m}_{tank_{min}} & \dot{m}_{tank_0} \leq \dot{m}_{tank_{min}} \\ \dot{m}_{tank_{max}} & \dot{m}_{tank_0} \geq \dot{m}_{tank_{max}} \end{cases} \quad (2.28)$$

Ground Source Heat Pump Heat and Mass Flow

The community thermal storage tank 305 is controlled first by determining whether cooling or heating is needed. If the target temperature is below the tank temperature, then cooling may be needed. Otherwise heating may be needed. This indicator is not a direct command for the ground source heat pump 307 to turn on. Economization may be able to meet the needed heat load.

$$cool = \begin{cases} True & T_{tank} \geq T_{tank_{targ}} \\ False & otherwise \end{cases} \quad (2.29)$$

The ground source heat pump control variables are significantly more complex because they involve logic to accommodate economization of water. There is no economization or ground source heat pump 307 operation in a temperature deadband, $\Delta T_{tanktarg}$, around $T_{tanktarg}$ for $T_{tank}$. The algorithm decides to wait or not wait based on the following logic.

$$wait = \begin{cases} True & [(not\ wait_0\ and\ cool)\ and\ (T_{tank} \leq T_{tank_{targ}})]\ or \\ & [(not\ wait_0\ and\ not\ cool)\ and\ (T_{tank} \geq T_{tank_{targ}})] \\ False & T_{tank_{targ}} - \frac{1}{2}\Delta T_{tank_{targ}} > T_{tank}\ or \\ & T_{tank_{targ}} + \frac{1}{2}\Delta T_{tank_{targ}} < T_{tank} \\ wait_0 & otherwise \end{cases} \quad (2.30)$$

A second logical variable is needed to decide whether to use the ground source heat exchanger 309, useGHX. This expression actually reduces to not wait but is part of the current programming which will have to be simplified later.

$$useGHX = \begin{cases} True & T_{tank_{targ}} - \frac{1}{2}\Delta T_{tank_{targ}} > T_{tank}\ or \\ & T_{tank_{targ}} + \frac{1}{2}\Delta T_{tank_{targ}} > T_{tank}\ or\ not\ wait \\ False & otherwise \end{cases} \quad (2.31)$$

For the ground source heat pump control, the ground source heat pump COP is first calculated. For now, the current model approximates this as a fraction of the Carnot efficiency bounded by maximum value for the heating coefficient of performance $COP_h$.

$$useGHX = \begin{cases} \frac{\eta_c T_{tank}}{T_{avg} - T_{tank}} & T_{avg} \geq T_{tank}\ and\ cool \\ COP_h - 1 & T_{avg} < T_{tank}\ and\ cool \\ \frac{\eta_c T_{tank}}{T_{tank} - T_{avg}} & T_{tank} > T_{avg}\ and\ not\ cool \\ COP_h & T_{tank} \leq T_{avg}\ and\ not\ cool \end{cases} \quad (2.32)$$

The algorithm also calculates the amount of heat needed to reach the tank temperature target ($T_{tanktarg}$) and the current power due to temperature change rates to determine the amount of time, totarg that economization would need to reach the target based on the current state of the tank.

$$\Delta H_{targ} = m_{tank} c_p (T_{tank} - T_{tank_{targ}}) \quad (2.33)$$

$$P_{T_{targ}} = m_{tank} c_p \frac{dT_{tank}}{dC} \quad (2.34)$$

$$t_{0_{targ}} = \left|\frac{\Delta H_{targ}}{P_{T_{tank}}}\right| \quad (2.35)$$

The target mass flow rate, $\dot{m}_{gshp}$, and target heat flow from the tank, $Q_{tanktarg}$, are then calculated.

$$Q_{tank_{targ}} = \begin{cases} 0.0 & t_{0_{targ}} < T_{targ} \\ -\left(\frac{\Delta H_{targ} + P_{T_{targ}} t_{targ}}{t_{targ}}\right) & otherwise \end{cases} \quad (2.36)$$

$$\dot{m}_{gshp_{targ}} = \begin{cases} \left|\frac{Q_{tank_{targ}}}{c_p \Delta T_{gshp}}\right| & \dot{m}_{gshp_{min}} \geq \left|\frac{Q_{tank_{targ}}}{c_p \Delta T_{gshp}}\right| \leq \dot{m}_{gshp_{max}} \\ \dot{m}_{gshp_{max}} & \dot{m}_{gshp_{min}} > \left|\frac{Q_{tank_{targ}}}{c_p \Delta T_{gshp}}\right| \\ \dot{m}_{gshp_{min}} & \left|\frac{Q_{tank_{targ}}}{c_p \Delta T_{gshp}}\right| > \dot{m}_{gshp_{max}} \end{cases} \quad (2.37)$$

The algorithm then becomes more difficult to write as simple math expressions and the python code for deciding the 1) amount of work to apply to the ground source heat pump 307, $W_{hp}$, 2) the mass flow rate of the GHX, $\dot{m}_{gshp}$, and 3) the amount of heat transfer achieved via economization, $Q_{econo}$, is summarized below.

Listing 2.1 GSHP control algorithm

```
if cool and Q_tank_targ > 0: # no cooling is needed
    return 0, 0, 0
else if cool and Q_tank_targ < 0:
    # determine if economization can meet the heating load
    if T_tank + 0.5dt dT_tank/dt > T_out :
        # a negative heat flux is desired
        Q_econo = ṁ_gshp c_p(T_out - (T_tank + 0.5dt dT_tank/dt ))
    else:
        Q_econo = 0.0
    if -Q_econo > -Q_tank_targ:
        W_hp = 0.0
        Q_econo = Q_tank_targ
```

-continued

Listing 2.1 GSHP control algorithm

```
  else:
      W_hp = min [(Q_tank_targ - Q_econo )/COP, W_hp_max ]
  else: # no heating is needed - let
  #the extra heat dissipate before acting
  return 0,0,0
  if not useGHX :
      W_hp = 0.0
  return W_hp, m_gshp, Q_econo
else:
  if Q_tank_targ > 0:
      if T_tank + 0.5dt dT_tank/dt < T_out:
          # want a positive result for heating
          Q_econo = m_gshp c_p (T_out - (T_tank + 0.5dt dT_tank/dt ))
      else:
          Q_econo = 0.0
      if Q_econo > Q_tank_targ:
          W_hp = 0.0
          Q_econo = Q_tank_targ
      else:
          W_hp = min [(Q_tank_targ - Q_econo)/COP, W_hp_max ]
      if not useGHX:
          W_hp = 0.0
      return W_hp, m_gshp, Q_econo
  else:
      # no heating is needed - let the extra heat dissipate before
```

Once $W_{hp}$, $\dot{m}_{gshp}$, COP, and $Q_{econo}$ have been determined, the actual evaporator and condenser side heat transfers for the ground source heat pump 307 can be determined. The heat transfer due to economization assumes that mass is flowing from the ground source heat exchanger output temperature and that mass is being moved at an equivalent rate from the tank at the average tank temperature over the time step.

$$Q_{tank} = \begin{cases} 0.0 & \dot{m}_{gshp} = 0.0 \\ W_{hp}COP - Q_{econo} & \text{cool} \\ -W_{hp}COP - Q_{econo} & \text{not cool} \end{cases} \quad (2.38)$$

$$Q_{GHX} = \begin{cases} 0.0 & \dot{m}_{gshp} = 0.0 \\ W_{hp}(1 + COP) - Q_{econo} & \text{cool} \\ -W_{hp}(COP - 1) - Q_{econo} & \text{not cool} \end{cases} \quad (2.39)$$

Pumping

The estimates for pumping power from $\dot{m}_{gshp}$ and m tank were formulated using the Water Network Tool for Resilience (WNTR). The power applied to the $W_{p1}$ and $W_{p2}$ pumps were based off of two similar networks for the ground source heat exchanger and loop. Each loop was modeled as pipes for which the end node had to meet the circulation rate required. The analysis is intended to only represent energy needed to circulate water. Pressurization of the system is assumed to be facilitated by utility pumping through insertion of makeup water. This points to the need to have a higher power pressurization pump and extra valve, $v_4$, in FIG. 5 to be able to switch over to a micro-water network mode where the burden of positive pressure generation for the water system is carried by the water and heat hub micro-system 100 by increased pumping and the $v_4$ pressure reduction valve. Transient intertial effects of changing pumping speed are neglected by WNTR and are therefore not included in this analysis.

The ground source heat pump network was assumed to consist of every bore-hole placed in parallel to each other and all flow splitting from a single pump and being rejoined for thermal interaction with the ground source heat pump 307. Each bore-hole was assumed to be 80 m deep with 16 m of additional piping to the pump. Minor loss coefficients of 0.3 were applied four times for each bore hole to account for changes of direction of flow and 1 time for an additional turn to get to the pump.

For the collection of water and heat hub micro-systems 100, all water and heat hub micro-systems 100 collectively consumed a fraction ("frac" in the attached figures) of the original flow and the end node flow was (1–frac) of the original flow. Table 2-1 summarizes the inputs to the analysis for both loops.

TABLE 2-1

| Pumping parameter study inputs | | |
|---|---|---|
| Description | GSHP | Loop |
| Pipe length (m) | 176.0 per bore-hole | 320.0 |
| Minor loss coefficient sum | 1.5 per bore-hole | 30.0 |
| Pipe Roughness C-factor | 120.0 | 120.0 |
| Pipe Diameter (m) | 0.0457 | 0.3048 |
| Number of pipe elements | 2 | 31 |

Figure 10:
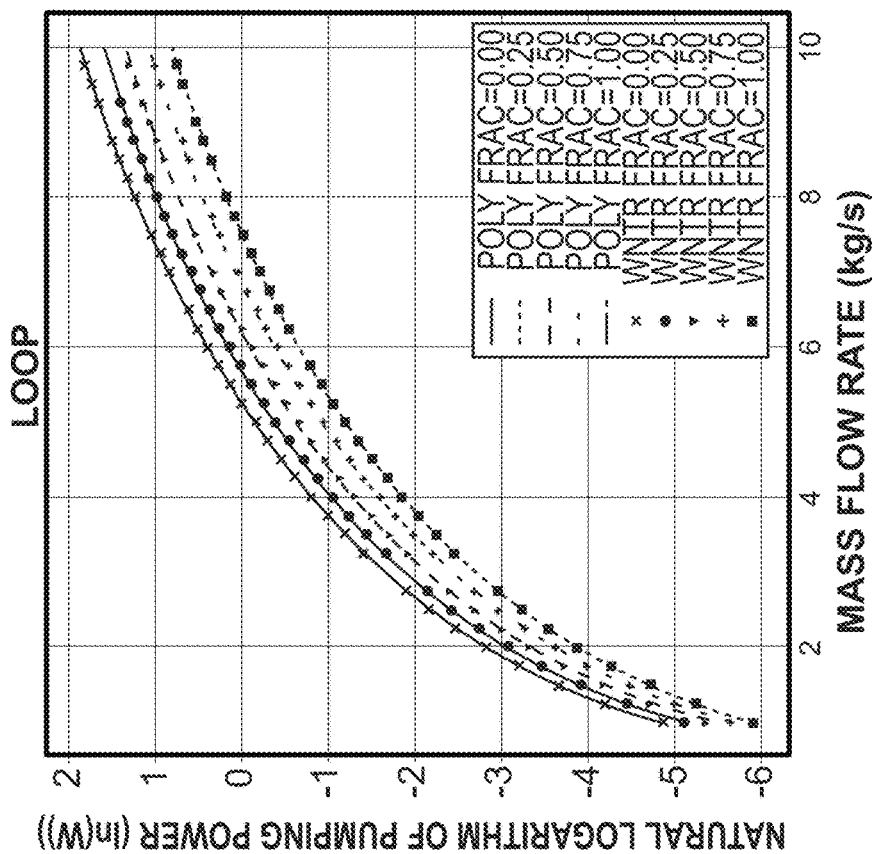
FIG. 10 shows a graph displaying pumping power study including multi-variate 6th order polynomial regression of the natural logarithm of total pumping power on a water and heat hub micro-system.
Figure 9:
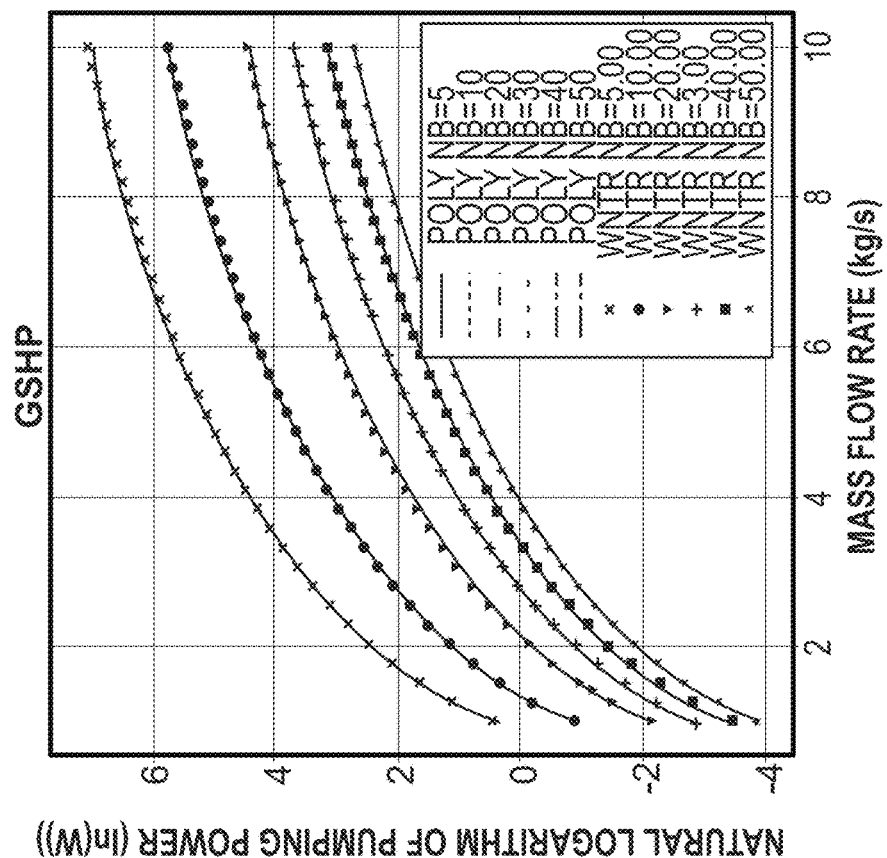
FIG. 9 shows a graph displaying pumping power study including multi-variate 6th order polynomial regression of the natural logarithm of total pumping power on a ground source heat pump system.

The runs in WNTR were too slow to incorporate into the rest of the system model. A multi-variate 6th order polynomial regression of the natural logarithm of total pumping power was therefore calculated for the ground source heat pump and water and heat hub micro-system loops as seen in FIG. 9. The ground source heat pump regression depends on the number of bore-holes 401 ("nb") as seen in FIG. 10. The water and heat hub micro-systems 100 depends on the fraction of water consumed in the triplexes having the water and heat hub micro-systems 100 ("frac"). The polynomial coefficients for the relationships in these figures are provided in Table 2-2. Both regressions are only value for a range of 0-10 kg/s.

TABLE 2-2

| WNTR study polynomial coefficients | | | |
|---|---|---|---|
| Mass flow rate polynomial power | nb or frac polynomial power | GSHP coefficients | Thermal bridge loop coefficients |
| 0 | 0 | −778.168 | −4.61638e−09 |
| 1 | 0 | 4.97213 | 5.20588 |
| 0 | 1 | −0.0084459 | −0.942381 |
| 2 | 0 | −1.63497 | −1.72875 |
| 1 | 1 | 0.00693378 | −0.016481 |
| 0 | 2 | −0.0557515 | −0.177254 |
| 3 | 0 | 0.347754 | 0.369929 |
| 2 | 1 | −0.00170639 | 0.00340246 |
| 1 | 2 | −0.0002355 | 0.0405863 |
| 0 | 3 | 0.00504813 | −0.0156144 |

TABLE 2-2-continued

WNTR study polynomial coefficients

| Mass flow rate polynomial power | nb or frac polynomial power | GSHP coefficients | Thermal bridge loop coefficients |
|---|---|---|---|
| 4 | 0 | −0.0430786 | −0.046067 |
| 3 | 1 | 0.000220422 | 0.000364062 |
| 2 | 2 | 3.57693e−05 | −0.0173677 |
| 1 | 3 | −1.05494e−06 | −0.000277222 |
| 0 | 4 | −0.000191935 | 0.017946 |
| 5 | 0 | 0.00284217 | 0.00304025 |
| 4 | 1 | −7.66454e−06 | −0.000105793 |
| 3 | 2 | −1.00142e−05 | 0.00143094 |
| 2 | 3 | 1.58381e−06 | 0.00975818 |
| 1 | 4 | 4.1428e−09 | −0.0163415 |
| 0 | 5 | 3.35897e−06 | 0.0288898 |
| 6 | 0 | −7.76783e−05 | −8.19967e−05 |
| 5 | 1 | 4.90529e−07 | 4.51594e−06 |
| 4 | 2 | 2.03341e−07 | 3.90512e−06 |
| 3 | 3 | 4.98332e−08 | −0.00102101 |
| 2 | 4 | −2.29536e−08 | 0.00207246 |
| 1 | 5 | 6.45349e−10 | −0.00699428 |
| 0 | 6 | −2.2165e−08 | 0.0373866 |

Overall System COP

The overall community thermal storage tank, ground source heat pump, water and heat hub micro-system loop COP, $COP_{CC}$, is the ratio of the heat removed from all water and heat hub micro-systems 100 to the total work input to the entire connect community system 300. This total work is equal to the sum of pumping, ground source heat pump 307, and water source heat pump at the water and heat hub micro-system 100 for the connected community system 300. For comparison to a non-connected system, a second case is analyzed where the load in FIG. 8 is met by unconnected air source heat exchanger in each water and heat hub micro-system 100. The community thermal storage tank 305, ground source heat pump 307, water and heat hub micro-system 100 outperforms the unconnected air source heat exchanger system to be able to claim higher energy efficiency despite the increase in complexity of the systems.

$$COP_{cc} = \frac{Q_{hpe}}{W_{hp} + W_{p1} + W_{p2} + NTW_{wshp}} \quad (2.40)$$

$$COP_{ASHP_y} = \frac{1}{NT} \frac{Q_{hpe}}{W_{ashp}} \quad (2.41)$$

These values only apply for each time step and a yearly value involves summing all heat and work before calculating the ratio. These can be divided into cooling and heat performance through only summing heating or only summing cooling loads.

$$COP_{CC_y} = \frac{\sum_t Q_{hpe}}{\sum_t [W_{hp} + W_{p1} + W_{p2} + NTW_{wshp}]} \quad (2.42)$$

$$COP_{ASHP_y} = \frac{1}{NT} \frac{\sum_t Q_{hpe}}{\sum_t W_{ashp}} \quad (2.43)$$

Model Calibration

The verification and validation of this modeling effort need further work to provide high confidence in the results from the community thermal storage tank, ground source heat pump, water and heat hub micro-system model presented. Regardless, an effort was made to calibrate the model to higher fidelity modeling accomplished by Oak Ridge National Laboratory (ORNL). The inputs for analysis were compiled and are seen in Table 2-3. After performing an unspecified analysis with these inputs, it was found that, that for each triplex [unit], a single ground heat exchanger with 270 ft (82 m) deep should be enough to maintain the leaving water temperature from the ground heat exchanger (i.e., the entering water temperature of the heat pump) between 3° C. to 35° C. during 20 years operation.

TABLE 2-3

GSHP Detailed Analysis Inputs

| Analysis Input | Value |
|---|---|
| Ground Temperature (all depths) (° C.) | 20 (Reiter, 2007 https://doi.org/https://doi.org/10.1029/2006JD008215 and Reiter, 2006 https://doi.org/10.2113/gseegeosci.12.4.353 ) |
| Thermal Conductivity (W/m/K) | 0.4 (Kelley et. al. https://geoinfo.nmt.edu/publications/monographs/circulars/downloads/156/Circular-156.pdf, and Samta et al. 2017 https://doi.org/https://doi.org/10.1016/j.egypro.2017.08.287) |
| Specific Heat (J/kg/K) | 800 (generic value for sand/gravel/silt) |
| Density (g/cm³) | 1.9 (Stone et. al., 1998 https://pubs.usgs.gov/of/1998/0210/report.pdf) |

TABLE 2-3-continued

GSHP Detailed Analysis Inputs

| Analysis Input | Value |
|---|---|
| Heating and Cooling Peak Load (W/triplex unit) | 2500 (Load data very similar to FIG. 2-5 but differences may exist) |

TABLE 3-1

WTS-GSHP-thermal bridge loop parameter study inputs

| Analysis Input | Value(s) |
|---|---|
| Number of bore-holes $N_b$ | 15, 25, 30, 35, 40, 45, 50 |
| Tank height $h_{tank}$ (m) [Volume (m$^3$)] | 3 [21.2], 4 [28.3], 5 [35.3] |
| GSHP compressor capacity $W_{hp_{max}}$ | 10.0 |

This statement was used to adjust the resistance for direct transmission of heat to the ground through the $f_{b1}$ term in Equation 2.3.5 which alters the heat transfer to ground terms, $Q_{g1}, Q_{g2}, \ldots$, in FIG. 5. The value of $f_{b1}$ was adjusted until the least squares error between the minimum and maximum temperatures of the ground source heat pump system under a single triplex heat load were at a minimum with respect to ORNL 3° C. to 35° C. range. This analysis is seen in FIG. 10 where the final value was $f_{b1}$=4.19313E-09 as seen at the star marker. The minimum temperature of 3° C. was not intersected but is less important.

Figure 11:
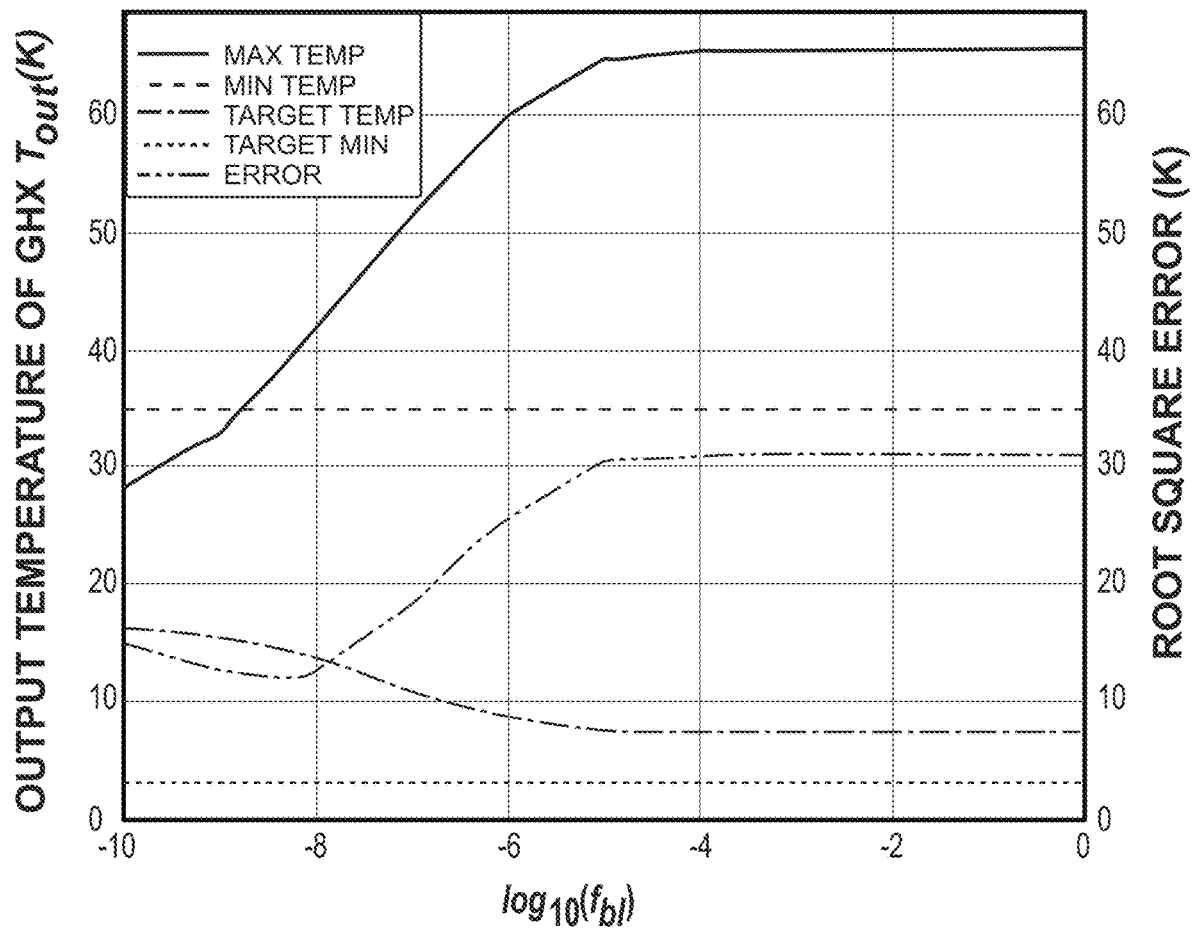
FIG. 11 shows a graph displaying ground source heat exchanger model calibration results.
Figure 12:
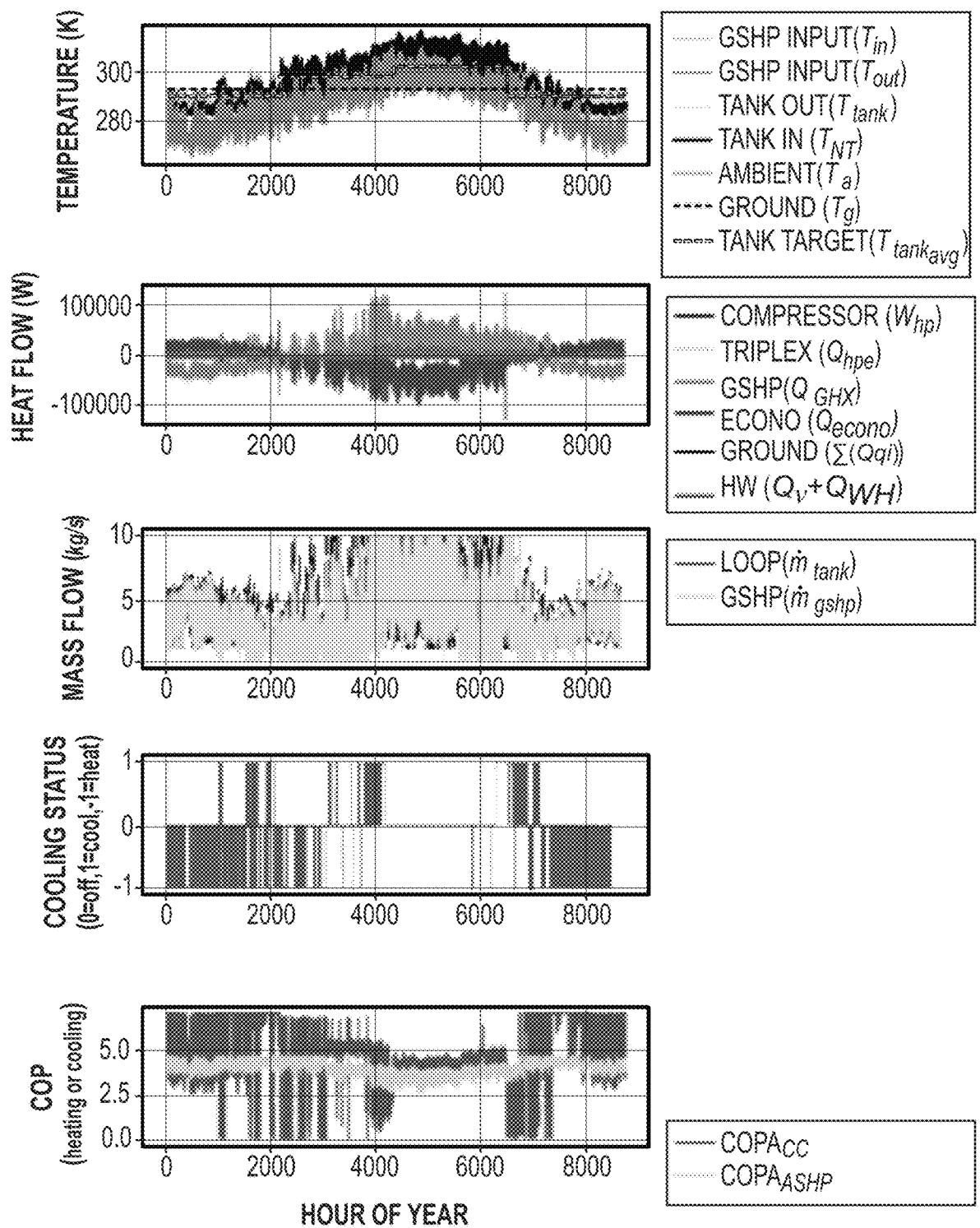
FIG. 12 shows graphs displaying connected community system 300 performance for 1 year utilizing 35 bore-holes and a 21.1 $m^3$ community thermal storage tank.
Figure 13:
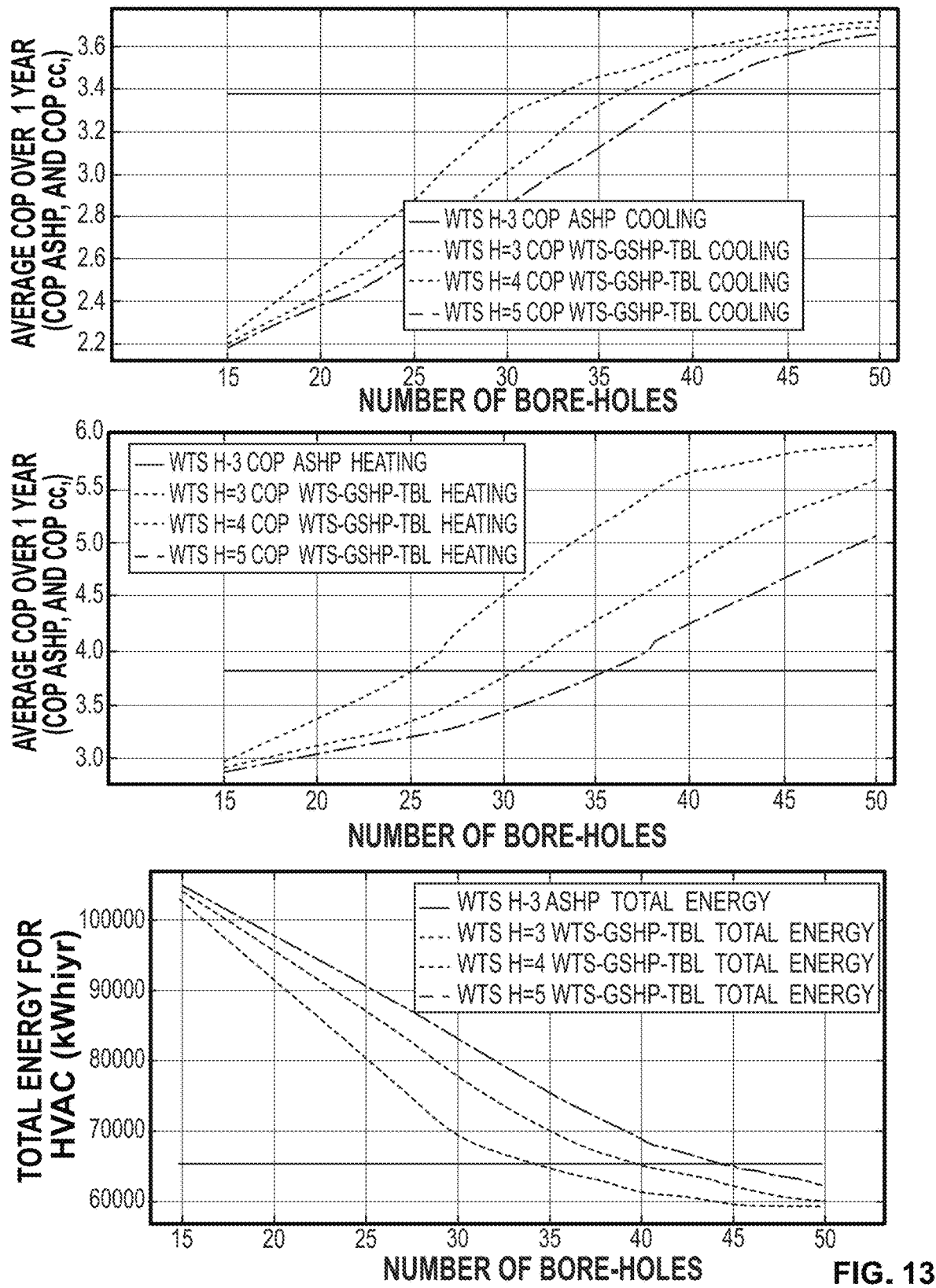
FIG. 13 shows total energy for 30 water and heat hub micro-systems 100 and coefficient of performance for 1 year of operation of a connected community system.

FIG. 11 shows ground source heat exchanger model calibration results. FIG. 12 shows connected community system 300 performance for 1 year utilizing 35 bore-holes 401 and a 21.1 m$^3$ community thermal storage tank. FIG. 13 shows total energy for 30 water and heat hub micro-systems 100 and COP for 1 year of operation.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It should be noted that although the figures herein may show a specific order of method steps, it is understood that the order of these steps may differ from what is depicted.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. A water and heat hub micro-system for managing water and heat in water utilized by water appliances comprising:
 a thermal bridge comprising:
   a controller and at least one mixing valve, the controller controllably connected to the at least one mixing valve;
   at least one isolation valve; and
   a pump;
   wherein the thermal bridge being arranged and disposed to selectively combine water from a fresh water source, a network water interface and a local water source to output product water to one or more water appliances, the water appliances and the thermal bridge being in fluid communication by component supply lines;
 wherein the controller operates the at least one mixing valve, the at least one isolation valve and the pump in response to signals corresponding to one or more of temperature, pressure and water quality measurements received from at least one appliance.

2. The water and heat hub micro-system of claim 1, wherein the fresh water source is from a water utility, a well, desalination technology, water harvesting device from air, or a combinations thereof.

3. The water and heat hub micro-system of claim 1, wherein the network water interface is connected to one or more additional water and heat hub micro-systems.

4. The water and heat hub micro-system of claim 1, wherein the local water source is a water storage device.

5. The water and heat hub micro-system of claim 4, wherein the water storage device is configured to allow operation of the water and heat hub micro-system in isolation from the fresh water source and the network water interface.

6. The water and heat hub micro-system of claim 1, wherein the water appliances are selected from the group of a water source heat pump, a water heater, water treatment system, ice maker and combinations thereof.

7. The water and heat hub micro-system of claim 1, wherein the signals are obtained from at least one sensor.

8. The water and heat hub micro-system of claim 7, wherein the sensor is selected from a temperature sensor, a pressure sensor, a water quality sensor and combinations thereof.

9. The water and heat hub micro-system of claim 7, wherein the at least one sensor includes a temperature sensor, a pressure sensor, and a water quality sensor.

10. The water and heat hub micro-system of claim 1, wherein the controller is a component of a control system that provides data and control to the water and hub micro-system.

11. The water and heat hub micro-system of claim 1, wherein the controller is a component of a control system that communicates data to or from components or systems outside the water and hub micro-system.

12. A method for transferring heat and water utilized by water appliances comprising:
  providing water to water appliances through a thermal bridge, the thermal bridge comprising:
    a controller controllably connected to at least one mixing valve;
    at least one isolation valve and a pump, the thermal bridge being arranged and disposed to selectively combine water from a fresh water source, a network water interface and a local water source to output product water to one or more water appliances, the one or more water appliances and the thermal bridge being in fluid communication by component supply lines; and
  operating the at least one mixing valve, the at least one isolation valve and the pump with the controller in response to signals corresponding to one or more of temperature, pressure and water quality measurements received from the one or more water appliances.

13. The method of claim 12, wherein operating includes obtaining temperature, pressure and water quality measurements resulting from a first operation and operating the at least one mixing valve, the at least one isolation valve and the pump with the controller according to a second operation that is in response to temperature, pressure and water quality measurements resulting from the first operation.

14. The method of claim 13, further comprising iteratively obtaining temperature, pressure and water quality measurements and providing operation by the controller in response to the iterative measurements of temperature, pressure and water quality measurements.

15. The method of claim 12, wherein the operating includes operating the at least one isolation valve in response to a pressure measurement to isolate the water and heat hub micro-system from one or both of the fresh water source or the network water interface.

16. The method of claim 12, wherein the controller is a component of a control system that provides data and control to a water and hub micro-system.

17. The method of claim 12, wherein the controller is a component of a control system that communicates data to or from components or systems outside a water and hub micro-system that includes the thermal bridge.

* * * * *